(12) United States Patent
Jeong

(10) Patent No.: US 8,358,885 B2
(45) Date of Patent: Jan. 22, 2013

(54) OPTICAL SEMICONDUCTOR DEVICE, MANUFACTURING METHOD THEREOF AND OPTICAL TRANSMISSION DEVICE

(75) Inventor: Seok-Hwan Jeong, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 12/607,442

(22) Filed: Oct. 28, 2009

(65) Prior Publication Data

US 2010/0158443 A1 Jun. 24, 2010

(30) Foreign Application Priority Data

Dec. 24, 2008 (JP) ................................ 2008-328194

(51) Int. Cl.
*G02B 6/26* (2006.01)
*G02B 6/42* (2006.01)

(52) U.S. Cl. ................. 385/32; 385/42; 385/43

(58) Field of Classification Search ............ 385/32, 385/42, 43
See application file for complete search history.

(56) References Cited

U.S. PATENT DOCUMENTS

| | | | | |
|---|---|---|---|---|
| 5,138,676 A * | 8/1992 | Stowe et al. | ............. | 385/32 |
| 5,177,803 A * | 1/1993 | Newhouse et al. | ............. | 385/43 |
| 5,195,151 A * | 3/1993 | Campbell et al. | ............. | 385/43 |
| 5,675,679 A * | 10/1997 | Yuuki | ............. | 385/43 |
| 6,442,321 B1 * | 8/2002 | Berini | ............. | 385/130 |
| 6,516,120 B2 * | 2/2003 | Roberts et al. | ............. | 385/43 |
| 6,621,972 B2 * | 9/2003 | Kimerling et al. | ............. | 385/132 |
| 6,859,582 B2 * | 2/2005 | Cai et al. | ............. | 385/30 |
| 6,865,322 B2 * | 3/2005 | Tallent et al. | ............. | 385/39 |
| 6,973,241 B2 * | 12/2005 | Kelly et al. | ............. | 385/50 |
| 7,006,744 B2 * | 2/2006 | Carniel et al. | ............. | 385/129 |
| 7,496,254 B2 * | 2/2009 | Miyadera et al. | ............. | 385/32 |
| 2001/0002219 A1 * | 5/2001 | Mori et al. | ............. | 385/46 |
| 2002/0015561 A1 * | 2/2002 | Kawashima et al. | ............. | 385/42 |
| 2002/0031304 A1 * | 3/2002 | Roberts et al. | ............. | 385/43 |
| 2002/0041434 A1 * | 4/2002 | Wu et al. | ............. | 359/337.1 |
| 2002/0076188 A1 * | 6/2002 | Kimerling et al. | ............. | 385/132 |
| 2002/0094168 A1 * | 7/2002 | Cai et al. | ............. | 385/43 |
| 2005/0185888 A1 * | 8/2005 | Willig | ............. | 385/43 |
| 2005/0196102 A1 | 9/2005 | Yamazaki et al. | | |
| 2006/0133726 A1 | 6/2006 | Sugiyama et al. | | |
| 2006/0222039 A1 | 10/2006 | Yamazaki | | |
| 2007/0154139 A1 * | 7/2007 | Dimmick et al. | ............. | 385/30 |

(Continued)

FOREIGN PATENT DOCUMENTS

| | | |
|---|---|---|
| JP | 4-213407 A | 8/1992 |
| JP | 6-067047 A | 3/1994 |

(Continued)

OTHER PUBLICATIONS

Japanese Notification of Reasons for Refusal mailed May 29, 2012, issued in corresponding Japanese Patent Application No. 2008-328194, with partial English translation.

(Continued)

*Primary Examiner* — Rhonda Peace
(74) *Attorney, Agent, or Firm* — Westerman, Hattori, Daniels & Adrian, LLP

(57) ABSTRACT

An optical semiconductor device, including a first optical waveguide with a first width, a second optical waveguide with a second width narrower than the first width with a bending region, and a third optical waveguide with a third width wider than the second width and coupled to the second optical waveguide.

22 Claims, 26 Drawing Sheets

U.S. PATENT DOCUMENTS

2007/0154141 A1* 7/2007 Miyadera et al. ............... 385/32
2010/0158443 A1* 6/2010 Jeong ............................. 385/50

FOREIGN PATENT DOCUMENTS

| | | |
|---|---|---|
| JP | 11-52158 A | 2/1999 |
| JP | 2001-249238 A | 9/2001 |
| JP | 2003-207665 A | 7/2003 |
| JP | 2003-258368 A | 9/2003 |
| JP | 2005-284256 A | 10/2005 |
| JP | 2006-278770 A | 10/2006 |

OTHER PUBLICATIONS

Japanese Notice of Reason for Refusal dated Sep. 11, 2012, issued in corresponding Japanese patent application No. 2008-328194, w/ partial English translation.

* cited by examiner

OPTICAL SEMICONDUCTOR DEVICE, MANUFACTURING METHOD THEREOF AND OPTICAL TRANSMISSION DEVICE

CROSS REFERENCE TO RELATED APPLICATION

This application is based upon and claims the benefit of priority from prior Japanese Patent Application No. 2008-328194, filed on Dec. 24, 2008, the entire contents of which are incorporated herein by reference.

FIELD

The present disclosure relates to an optical semiconductor device, manufacturing method thereof, and an optical transmission device that are used, for example, for an optical communication system.

BACKGROUND

Recently, optical communication systems have employed a wavelength-division multiplexing (WDM) signal processing method. This has dramatically increased transmission capacity of the optical communication systems.

In this case, various optical functional devices may be required to provide advanced functions for the optical signal processing. A bending optical waveguide is used for changing a direction of light propagation in order to achieve smaller-size and higher-density of optical functional elements. Such a bending waveguide may be provided in order to prevent light reflection at an end face of an optical functional element.

Excitation of a higher-order mode in an optical functional element, especially the element that includes an optical branching and coupling element and an interferometer significantly influences the element and eventually deteriorates performance of the optical communication system. The smaller the size of the optical functional element (optical integrated device), the more likely the excited higher-order mode further excites a leakage mode and could cause negative effects.

Accordingly, various methods are proposed to remove an excited higher-order mode.

A method (first method) is proposed in which an S-shaped bending region is provided in one waveguide side of an optical branching and coupling element to remove an excited higher-order mode by making light radiate at the S-shaped bending region.

Another method (second method) is proposed in which a width of one waveguide side of an optical branching and coupling element is made narrower to remove a higher-order mode, and a width of a bending waveguide of a branching part (coupling part) is made wider to suppress a bending loss.

Furthermore, a third method is proposed in which a filter for removing a higher-order mode is provided in one waveguide side of an optical branching and coupling element. For example, when a 1×1 multimode interference (MMI) coupler is provided as a filter for removing a higher-order mode, a fundamental mode passes with little or no excessive loss, however the higher-order mode is subject to substantial loss and may not pass, thus higher-order mode may be selectively removed. The third method, however, increases the number of elements, thereby enlarging the device size. Moreover, an insertion loss due to the filter for removing the higher-order mode and wavelength dependence of the filter for the removing higher-order mode itself is additionally caused, which may influence device characteristics.

Related techniques are disclosed in Japanese Laid-open Patent Publications No. hei. 06-67047, and No. 2006-278770.

Each of the foregoing methods assumes that the higher-order mode is excited and removes a higher-order mode so that the excited higher-order mode may not exert negative influence.

However, it is desirable that a higher-order mode is not excited.

On the other hand, it is found that providing an S-shaped bending region or a bending waveguide excites a higher-order mode at the bending region of the S-shaped bending region or the bending waveguide.

Therefore, it is desirable that excitation of a higher-order mode itself in a bending waveguide be prevented.

SUMMARY

Accordingly, the descriptions herein provide an optical semiconductor device including a first optical waveguide with a first width, a second optical waveguide with a second width narrower than the first width and includes a bending region and a third optical waveguide with a third width wider than the second width and coupled to the second optical waveguide. According to another aspect, an optical semiconductor device includes a first optical element, an optical waveguide coupled to the first optical element, a second optical element coupled to the optical waveguide, wherein the optical waveguide including a first optical waveguide with a first width and coupled to the first optical element, a second optical waveguide with a second width wider than the first width that includes a bending part and coupled to the first optical waveguide, and a third optical waveguide with a third width wider than the second width and coupled to the second optical waveguide.

According to another aspect, an optical transmission device includes a first optical element, an optical waveguide coupled to the first optical element, a second optical element coupled to the optical waveguide, wherein the optical waveguide including a first optical waveguide with a first width and coupled to the first optical element, a second optical waveguide with a second width narrower than the first width, and that includes a bending part and coupled to the first optical waveguide and a third optical waveguide with a third width wider than the second width and coupled to the second optical waveguide.

According to a further aspect, an optical semiconductor manufacturing method includes forming a core layer and a clad layer over a semiconductor substrate, and processing the core layer and the clad layer to form a waveguide stripe structure in which a first optical waveguide with a first width, a second optical waveguide with a second width narrower than the first width and that includes a bending part, and a third optical waveguide with a third width wider than the second width are formed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

First, the optical semiconductor device, and the manufacturing method according to the first embodiment will be described by referring to FIGS. 1 to 7.

Figure 1:
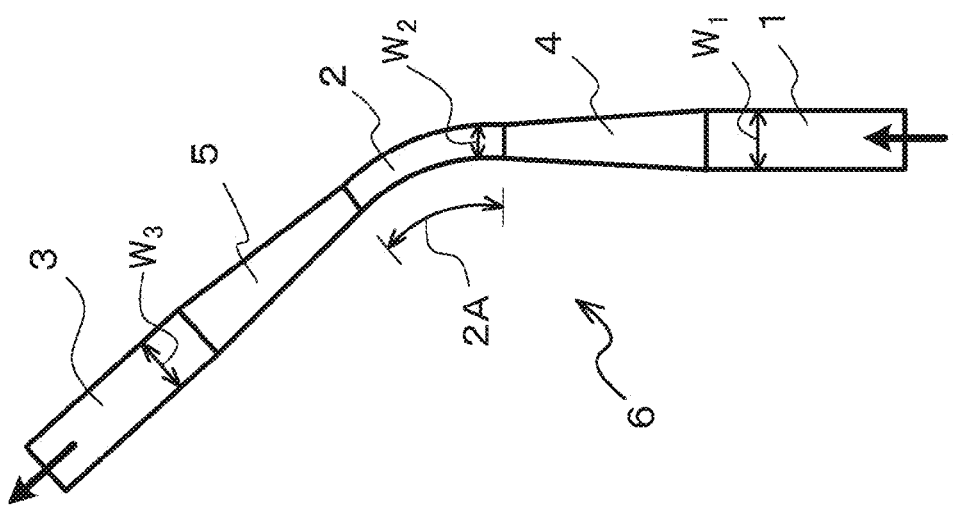
FIG. 1 is a schematic plain view illustrating a configuration of a bending waveguide included in an optical semiconductor device according to the first embodiment of the disclosure.

The optical semiconductor device according to this embodiment is an optical waveguide element (optical semiconductor element) that includes a bending waveguide. As illustrated in FIG. 1, the optical waveguide element includes a first optical waveguide (linear waveguide, linear region, input-side waveguide) with a first width W1, a second optical waveguide 2 (bending waveguide with a given radius of curvature) including a bending part (bending region) 2A with a width W2 narrower than the first width W1, and a third optical wave guide (linear waveguide, linear region, output-side waveguide) with a width W3 wider than the width W2.

An entire optical waveguide that includes the first optical waveguide 1, the second optical waveguide 2, and the third optical waveguide 3 may be assumed as a bending waveguide 6, or only the second optical waveguide 2 may be assumed as a bending waveguide. Bending waveguides are widely used for applications such as a branching and coupling element that branches or couples (multiplexing) optical signals in an optical communication system, or used for preventing reflection light at an end face of an optical functional element (cleaved end face), (for example, a bending waveguide may be used together with anti-reflection coating). Moreover, bending waveguides are widely used to couple elements in an optical semiconductor device (such as high-density optical integrated device, optical integrated circuit) in which a plurality of active elements and passive elements are integrated for providing advanced functions and increasing the number of functions to achieve smaller size.

According to this embodiment, as illustrated in FIG. 1, a first tapered optical waveguide 4 with a width of one end W1 and another end W2 is located between the first optical waveguide 1 and the second optical waveguide 2 (here, a tapered optical waveguide the width of which is gradually narrowed from the first optical waveguide 1 toward the second optical waveguide 2, or a width-tapered region). Moreover, a second tapered optical waveguide 5 with a width of one end is the second width W2 and that of the other end is a third width W3 is located between the second optical waveguide 2 and the third optical waveguide 3 (here, a tapered optical waveguide in which the width is gradually enlarged from the second optical waveguide 2 toward the third optical waveguide 3, or a width-tapered region).

As described above, according to this embodiment, the second optical waveguide 2 is coupled to the first optical waveguide 1 through the first tapered optical waveguide 4, and the third optical waveguide 3 is coupled to the second optical waveguide 2 through the second tapered optical waveguide 5. However, the disclosure is not limited to this, and the first optical waveguide 1 and the second optical waveguide 2 may be coupled without providing any tapered optical waveguide, and the second optical waveguide 2 and the third optical waveguide 3 may be coupled without providing any tapered optical waveguide. However, providing a tapered optical waveguide (a region where a mode is gradually changed) may reduce a coupling loss.

Figure 5:
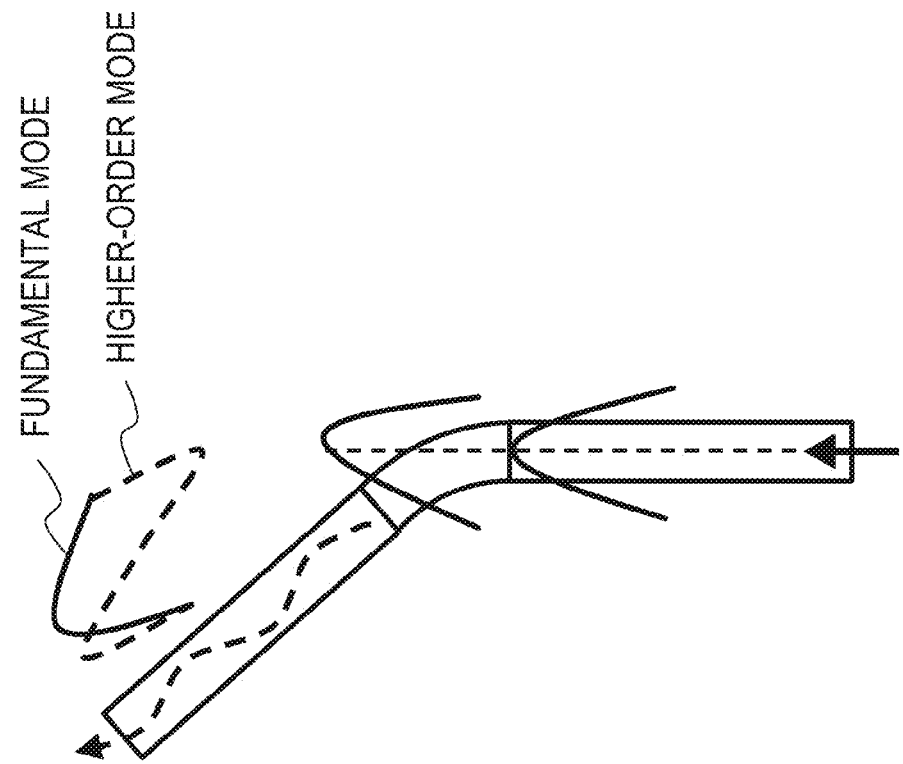
FIG. 5 illustrates a drawback of the optical semiconductor device according to the related art.

When an optical wave propagates in a bending waveguide, optical mode distribution tends to shift to an outer side of a bending waveguide (mode shift) because refractive index gradient is generated which the optical wave is subjected to, as illustrated in FIG. 5. Such shift of optical mode distribution in the bending waveguide may excite a higher-order mode when the optical wave is coupled to a linear waveguide again, and excitation of the higher-order mode leads to deterioration of the optical semiconductor device, and may eventually lead to deterioration of the optical communication system. Particularly, in a device that uses an optical branching and coupling element, and an interferometer, the properties may be substantially deteriorated.

Figure 6:
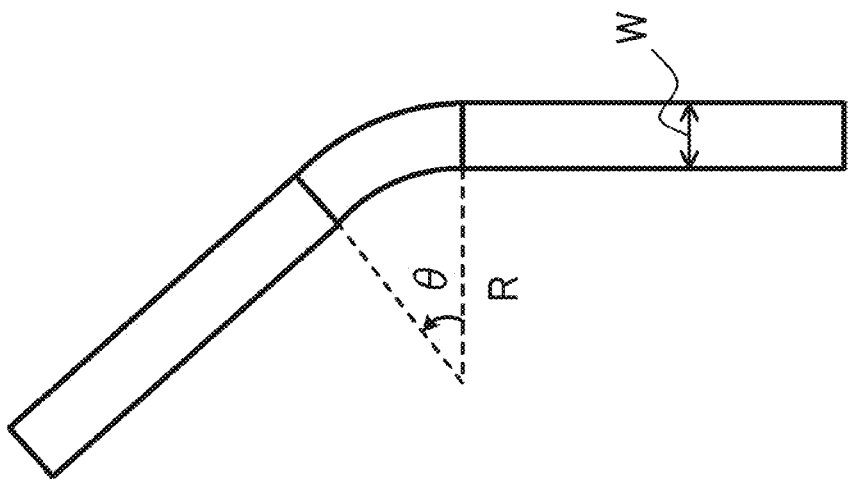
FIG. 6 illustrates a optical semiconductor device according to the related art.
Figure 7:
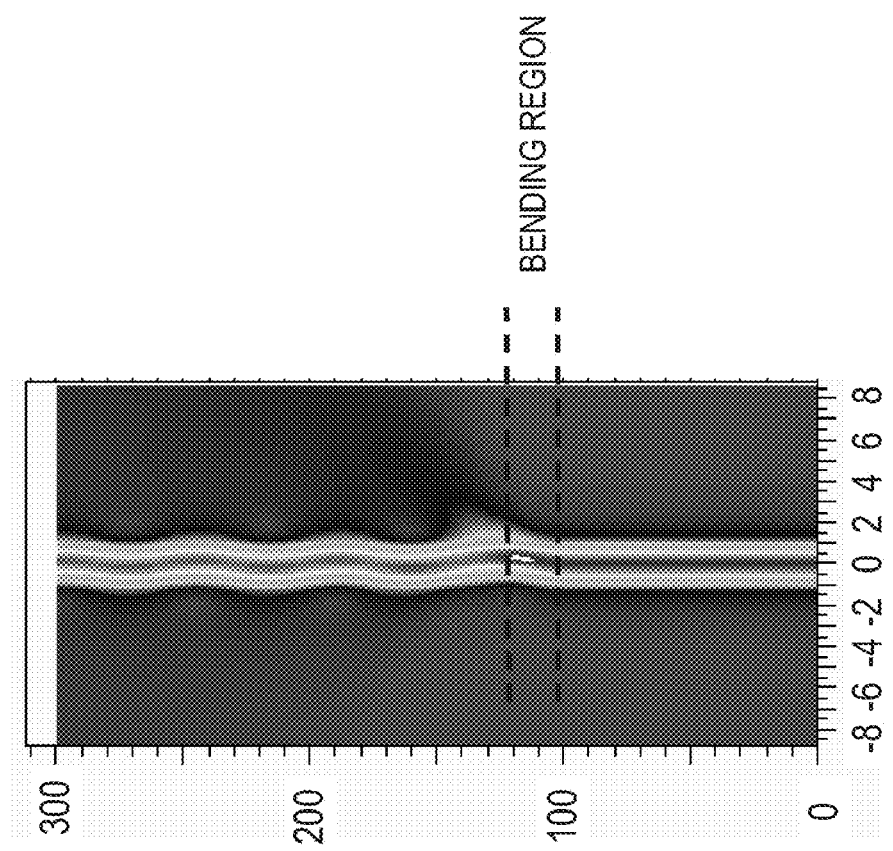
FIG. 7 illustrates a light propagation characteristics of the optical semiconductor device according to the related art.

FIG. 6 is a schematic plain view illustrating a bending waveguide of a related technique (here, that is the bending waveguide with a semiconductor buried structure using InP based material (semiconductor buried bending waveguide)). FIG. 7 illustrates light propagation characteristics (here, results of simulation calculation using conformal mapping) in the semiconductor buried bending waveguide illustrated in FIG. 6.

In this case, as illustrated in FIG. 6, a width W of semiconductor buried bending waveguide is substantially 1.6 μm, a radius of curvature R is substantially 300 μm, and a bending angle θ is substantially 7.

In FIG. 7, the optical wave may seem to be propagated in the linear waveguide; however, the same effect as when an optical wave propagates in a geometrical bending waveguide may be obtained by providing a gradient index at a region corresponds to a bending waveguide along the linear waveguide.

In the bending waveguide of related art illustrated in FIG. 6, an optical wave propagating in a bending waveguide is subject to a mode shift, a higher-order mode is excited when the optical wave is coupled to the linear waveguide (refer to FIG. 5) and interferes with a fundamental mode. As a result, the optical wave propagates while meandering as illustrated in FIG. 7. Such mode interference has wavelength dependence, and therefore wavelength characteristics of the optical semiconductor device (optical functional element) are substantially deteriorated.

Hence, substantially eliminating influence of a higher mode, in other words, preventing the higher mode from exciting is very important.

Figure 2:
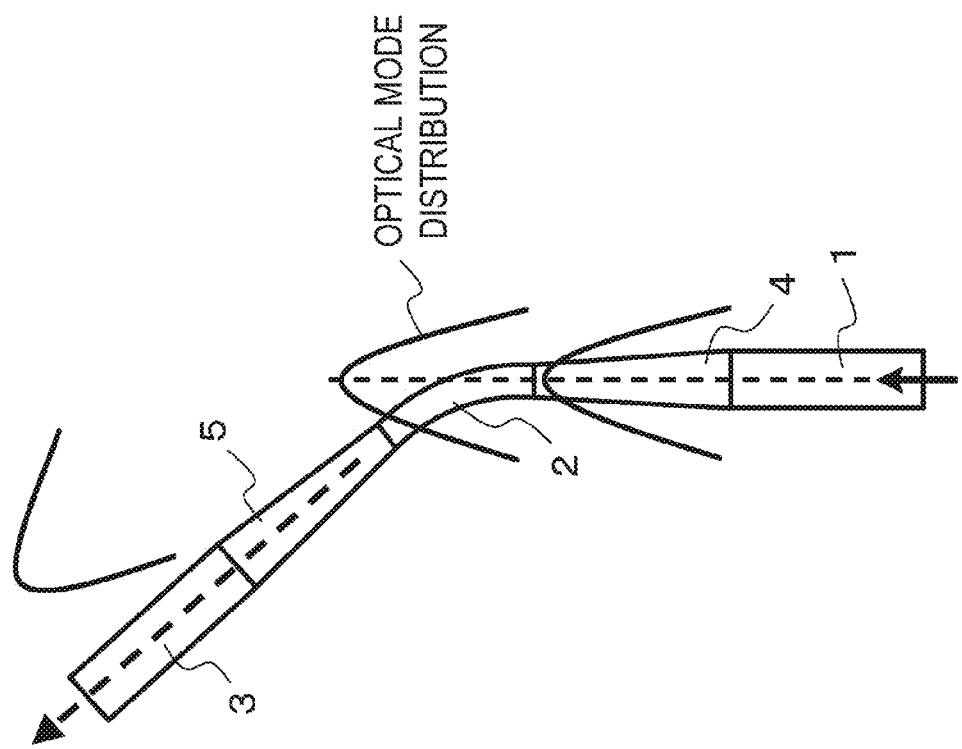
FIG. 2 is a schematic plain view illustrating how an optical wave propagates in the bending waveguide included in the optical semiconductor device according to the first embodiment of the disclosure.

Thus, according to this embodiment, as illustrated in FIG. 1, narrowing the width W2 of the second optical waveguide, that is the bending region 2A, in comparison to the widths W1 and W3 of the first optical waveguide 1 and the third optical waveguide 3, that are linear regions, suppresses shifting optical mode distribution, and thereby prevents excitation of the higher mode itself as illustrated in FIG. 2.

Hereunder, an example of a configuration of a bending waveguide 6 according to this embodiment will be described.

FIG. 1 is a schematic plain view illustrating a bending waveguide 6 according to this embodiment.

As illustrated in FIG. 1, the bending waveguide 6 according to this embodiment is the bending waveguide with a semiconductor buried structure using InP based material (semiconductor buried bending waveguide). In other words, the optical semiconductor device includes a buried structure in which the bending waveguide 6 that includes the first optical waveguide 1, the second optical waveguide 2 and the third optical waveguide 3 is buried.

Here, a linear region (the first optical waveguide (input waveguide) 1 and the third optical waveguide (output waveguide) 3) configured as input and output ends of the bending waveguide 6 is a single mode waveguide with a waveguide width that satisfies a single mode condition. That is the first optical waveguide 1 and the third optical waveguide 3 are single mode waveguides with widths that satisfy the single mode condition. In this case, the widths of the first width W1 and the third width W3 are substantially the same; however the widths may be different.

For example, the widths of input and output waveguide W1 and W3 are both substantially 1.6 μm. The waveguide width of the bending region 2A (the second optical waveguide 2) is substantially 1.0 μm, the radius of curvature is substantially 300 μm, and the bending angle θ is substantially 7. Moreover, a region between linear regions 1 and 3 and the bending region 2A (2) is adiabatically narrowed toward the bending region 2A by tapering the width (the width-tapered region 4, 5), and the taper length is substantially 200 μm.

Figure 3:
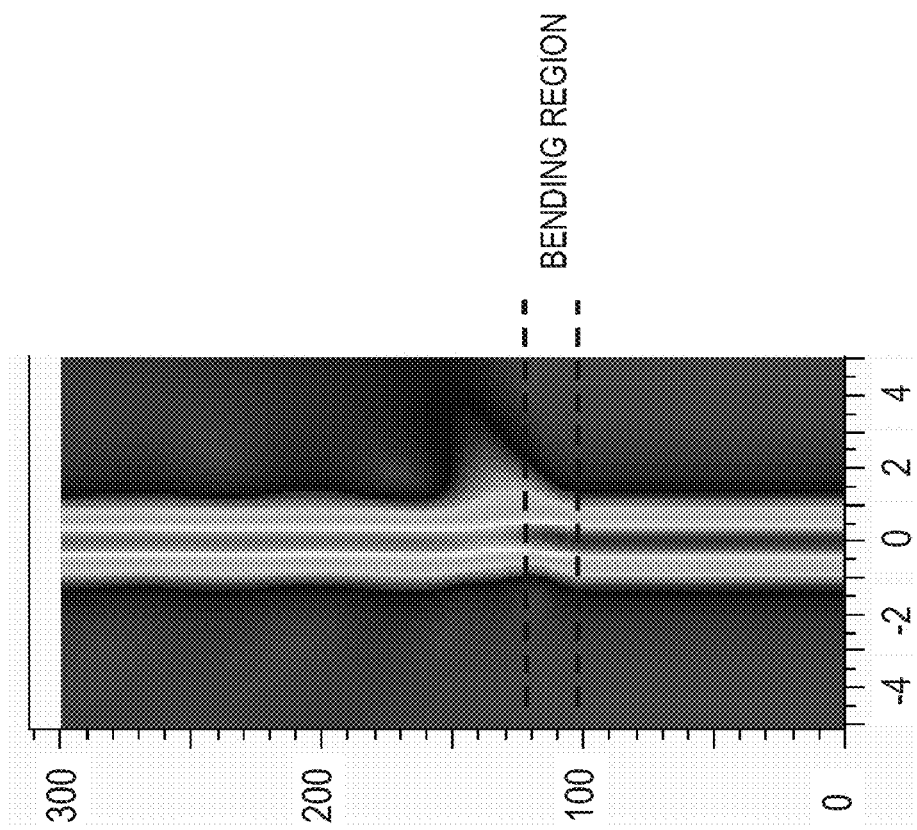
FIG. 3 illustrates light propagation characteristics (simulation calculation results) of the optical semiconductor device according to the first embodiment of the disclosure.

FIG. 3 illustrates light propagation characteristics of the bending waveguide 6 with a semiconductor buried structure as described above (refer to FIG. 1). FIG. 3 illustrates results of simulation calculation using conformal mapping.

In the bending waveguide 6 with the semiconductor buried structure (refer to FIG. 1) as illustrated in FIG. 3; meandering phenomenon is suppressed after an optical wave propagated in the bending waveguide coupling to the linear waveguide again. This is because that narrowing the waveguide width of the second optical waveguide 2 that is the bending region 2A reduces a mode confinement factor, thereby suppressing mode shift in the bending region 2A, and as a result, excitation of the higher mode is prevented. As such, using the semiconductor buried waveguide 6 (refer to FIG. 1) may eliminate a higher-order mode generated.

Now, a manufacturing method of the optical semiconductor device (manufacturing process of semiconductor waveguide) according to this embodiment will be described by referring to FIG. 4.

Figure 4:
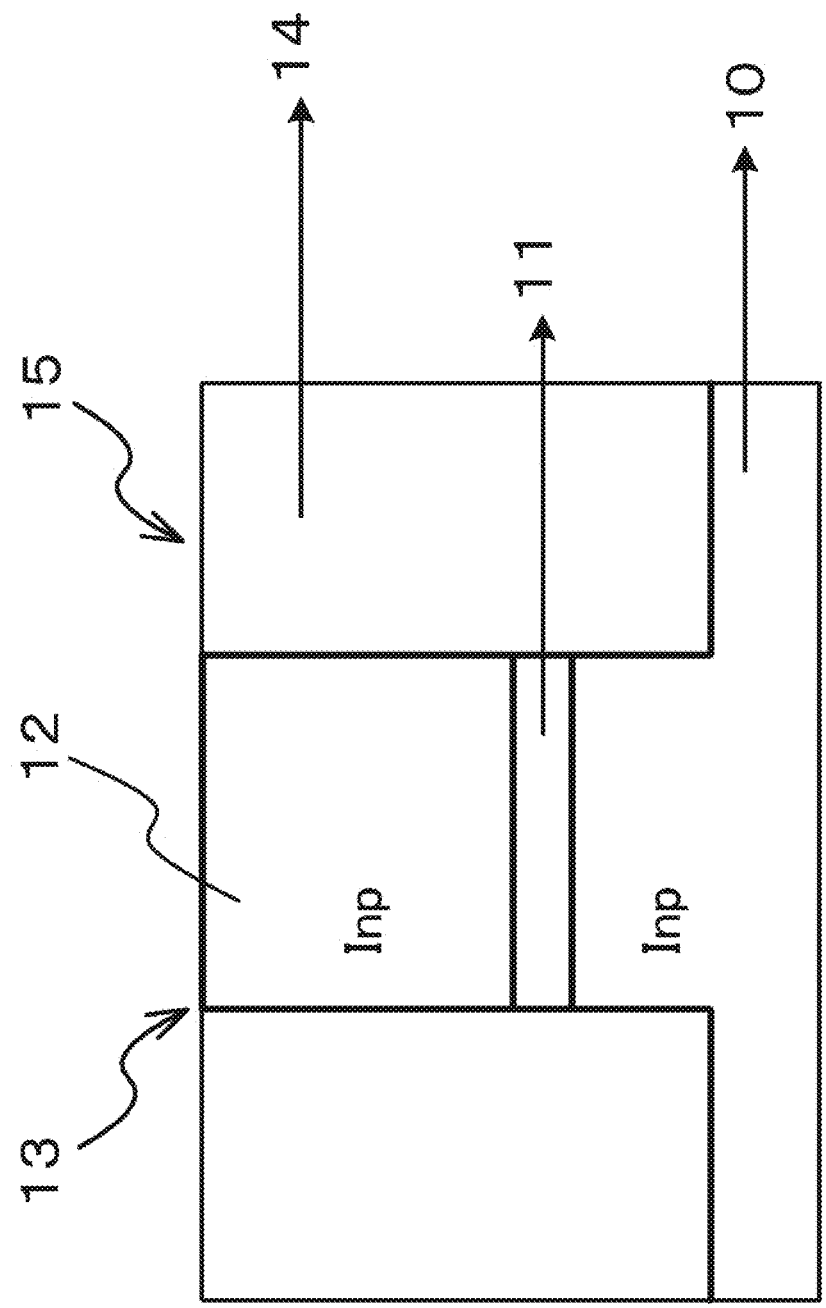
FIG. 4 is a schematic plain view illustrating a structure of a waveguide of the optical semiconductor device according to the first embodiment of the disclosure.

As illustrated in FIG. 4, for example, an undoped GaInAsP core layer 11 (emission wavelength 1.30 μm, and layer thickness substantially 0.2 μm), and a p-type InP clad layer 12 (layer thickness substantially 2.0 μm) (or an undoped InP clad layer) are formed over an n-type InP substrate 10 (or undoped InP substrate, semiconductor substrate) by epitaxial growth, for example, by a metal organic vapor phase epitaxial method (hereunder, called MOVPE).

A film, for example, a $SiO_2$ film is formed over the surface of the wafer to which the epitaxial growth is applied, for example, by a deposition apparatus, and patterning for a waveguide pattern for forming a waveguide stripe structure is applied by an optical exposure process using an optical exposure device.

As illustrated in FIG. 4, a waveguide stripe structure 13 (in this case, a high-mesa waveguide structure with a height of approximately 3 μm) is formed in a region where the first optical waveguide 1, the second optical waveguide 2, and the third optical waveguide 3 are formed by the following method. The method is that using the $SiO_2$ film to which the patterning is applied as described above as a mask (photomask), a core layer 11 and a clad layer 12 are processed by a dry etching with a method such as an Inductively Coupled Plasma reactive Ion Etching (ICP-RIE).

Here, the waveguide stripe structure 13 formed includes the first optical waveguide with a first width W1 (linear waveguide, here, with the waveguide width substantially 1.6 μm), a first tapered optical waveguide 4 (width-tapered waveguide with taper length substantially 200 μm), the second optical waveguide with a second width W2 that is narrower than the first width W1 and including a bending region 2A, a second tapered optical waveguide 5 (width-tapered waveguide with taper length substantially 200 μm), and the third optical waveguide 3 with a third width W3 that is wider than the second width W2 (linear waveguide with waveguide width substantially 1.6 μm) (refer to FIG. 1).

A waveguide pattern of the waveguide stripe structure 13 is defined by the foregoing mask pattern of the photomask.

As illustrated in FIG. 4, for example, a high resistance buried waveguide structure 15 is formed by buried crystal growth of a semi-insulating InP layer 14 (a buried layer, here, material (for example, the same material as the clad layer 12) with small refractive index difference with respect to the core layer 11) so that the waveguide stripe structure 13 formed by the foregoing manner is buried.

Through above manufacturing processes, the optical semiconductor device is formed.

Therefore, according to the optical semiconductor device and the manufacturing method of this embodiment, it is advantageous that excitation of a higher-order mode itself in the bending waveguide 6 (bending waveguide 2 that includes the bending region 2A) may be prevented.

Second Embodiment

Now, an optical semiconductor device and a manufacturing method of a second embodiment will be described by referring to FIG. 8.

Figure 8:
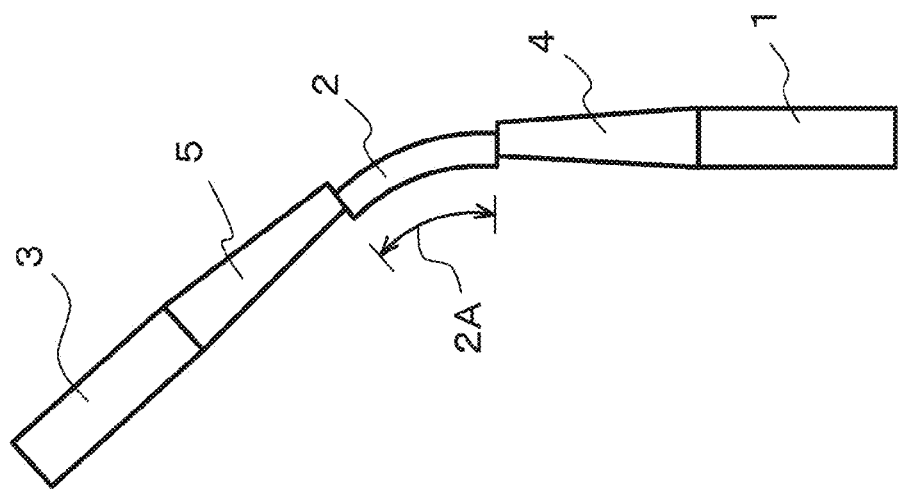
FIG. 8 is a schematic plain view illustrating a configuration of a bending waveguide included in an optical semiconductor device according to a second embodiment of the disclosure.

As illustrated in FIG. 8, an optical semiconductor device (optical semiconductor element) of this embodiment is different from that of the first embodiment in which a second optical waveguide 2 configuring a bending region 2A is offset. In FIG. 8, the same reference numerals as those in the first embodiment (refer to FIG. 1) are assigned for the same items.

In other words, the optical semiconductor device is different in that the second optical waveguide 2 is offset to the first optical waveguide 1, the first tapered optical waveguide 4, the second tapered optical waveguide 5, and the third optical waveguide 3. The waveguide pattern may be defined by a photomask of an optical exposure device, thus, may be manufactured by similar, if not the same manufacturing process as the foregoing first embodiment.

For example, a central axis of the second optical waveguide 2 is offset to central axes of the first optical waveguide 1, the first tapered optical waveguide 4, the second tapered optical waveguide 5, and the third optical waveguide 3 toward the side of the center of curvature of the bending region 2A.

The offset amount here may be set to a value so that a coupling loss between a linear waveguide (including a tapered waveguide) 1, 3 (4, 5) and the bending waveguide 2 is minimized. The width of the second optical waveguide 2 that is a bending waveguide may be set to a value so that excitation of a higher mode is suppressed while minimizing a radiation loss. By providing an offset in this manner, a coupling loss and a radiation loss may be controlled independently.

Other configuration and manufacturing method are similar, if not the same as the foregoing first embodiment, thus these will not be described here.

Thus, by using the optical semiconductor device and the manufacturing method according to this embodiment, it is advantageous that excitation of a higher-order mode itself in the bending waveguide 6 (bending waveguide 2 that includes the bending region 2A) may be prevented.

Third Embodiment

Now, an optical semiconductor device and a manufacturing method of a third embodiment will be described by referring to FIGS. 9 to 20.

Figure 16:
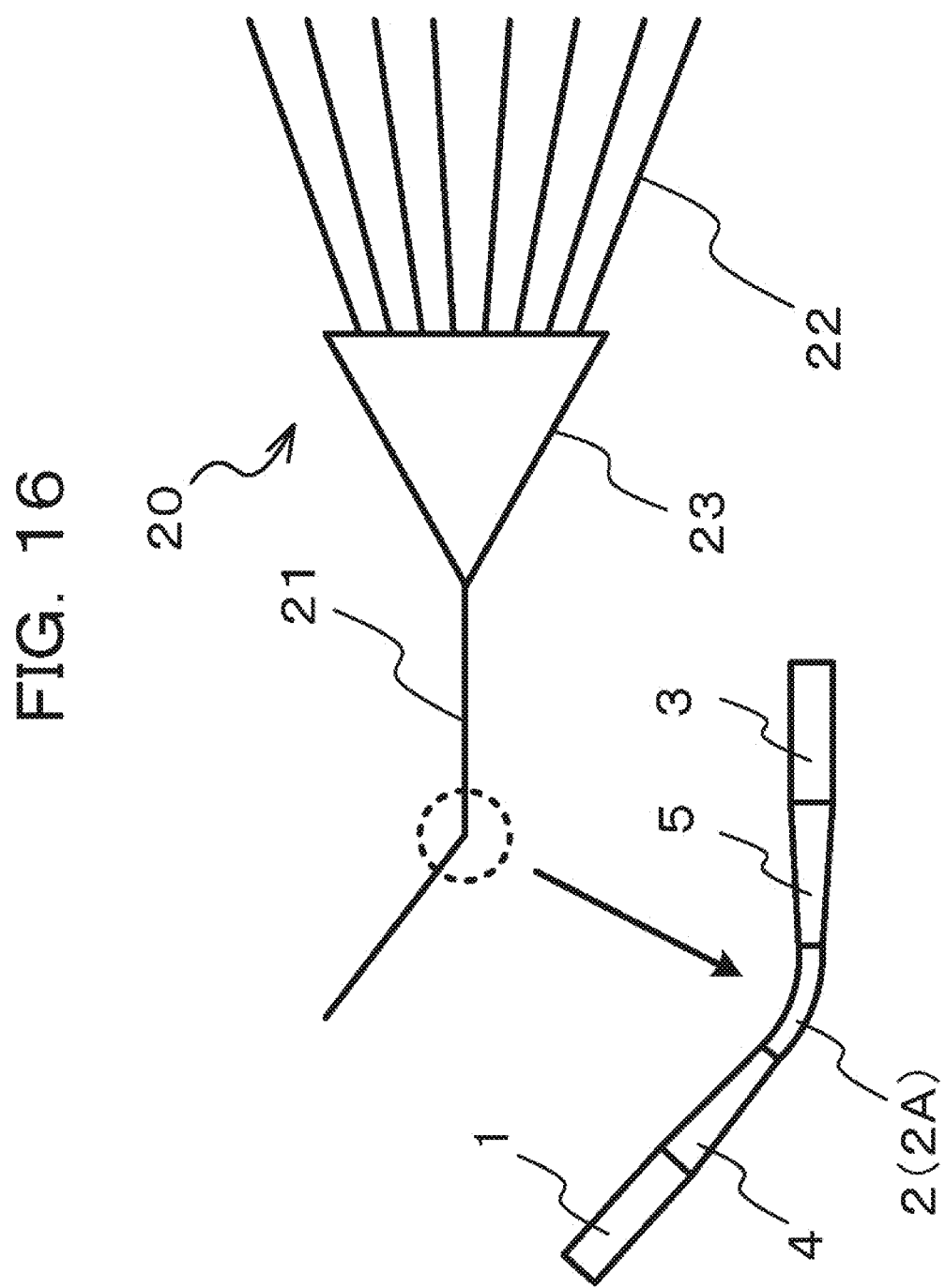
FIG. 16 is a schematic plain view illustrating a configuration of an optical semiconductor device (optical branching and coupling element that includes bending waveguide and a mode-converting coupler according to the first embodiment) according to a third embodiment of the disclosure.

As illustrated in FIG. 16, the optical semiconductor device (optical semiconductor element) according to this embodiment applies the bending waveguide 6 to an optical branching and coupling element 20 that includes a mode-converting coupler 23. In FIG. 16, the same reference numerals as those in the first embodiment (refer to FIG. 1) are assigned for the same items.

Hereunder, the following will be described, in order of: a configuration of the optical branching and coupling element without a bending waveguide (refer to FIG. 9) and the characteristics (refer to FIG. 10), a configuration of the optical branching and coupling element (refer to FIG. 11) that includes a bending waveguide of a related technique (refer to FIGS. 5 to 7) and the drawback (refer to FIG. 12), a configuration of the optical branching and coupling element (refer to FIG. 13) in which a bending waveguide of a related technique (refer to FIGS. 5 to 7) is offset and the drawback (refer to FIGS. 14 and 15); and a configuration of the optical branching and coupling element 20 that includes a bending waveguide 6 of the first embodiment (refer to FIG. 16) and the effects and advantages (refer to FIGS. 17 to 20).

A configuration of the optical branching and coupling element without a bending waveguide (refer to FIG. 9) and the property will be described by referring to FIGS. 9 and 10.

Figure 9:
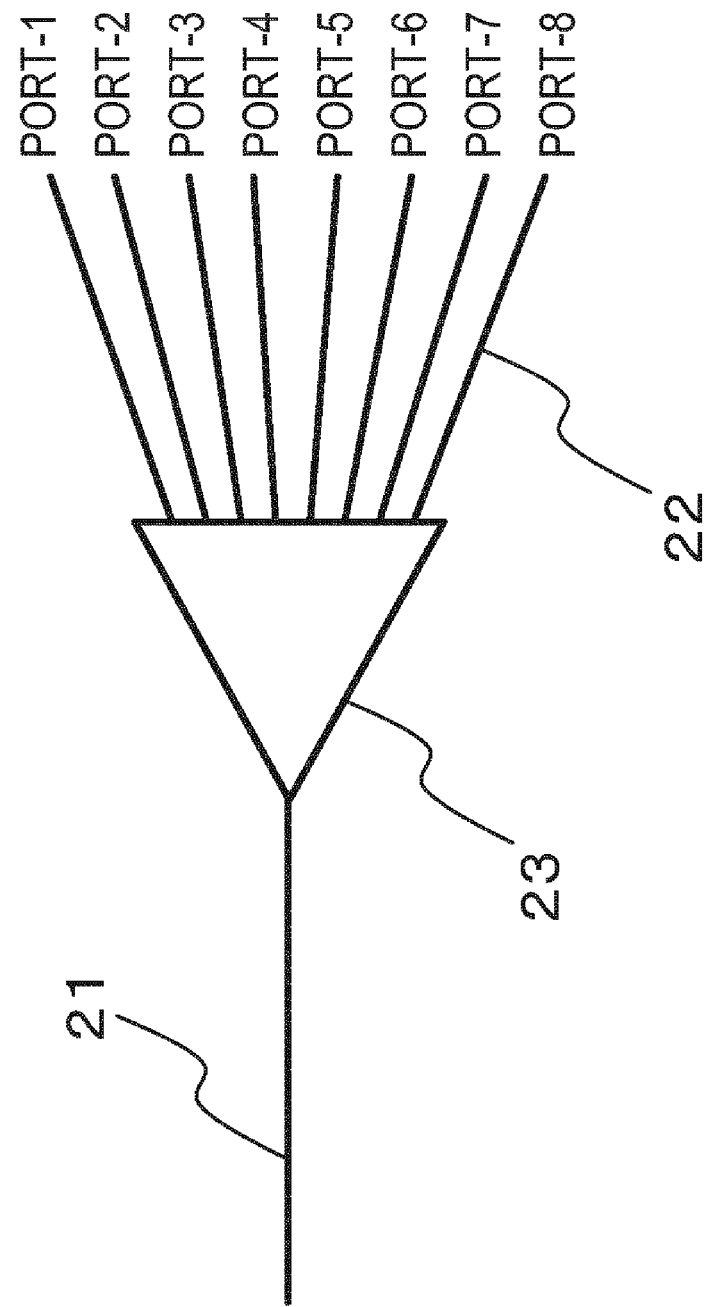
FIG. 9 is a schematic plain view illustrating a configuration of optical branching and coupling element that includes a general mode-converting coupler.

FIG. 9 illustrates a mode-converting coupler (1×8 field flattened coupler (FFC)) with 1×8 channels as an example of the optical branching and coupling element without a bending waveguide.

As illustrated in FIG. 9, the optical branching and coupling element that includes the mode-converting coupler 23 (optical coupler module device with 1×8 channels, optical branching/multiplexing device, optical branch coupler) includes, for example, one single mode input waveguide (linear waveguide) 21, multiple (in this case, 8 ports) output waveguides (array of waveguides) 22, and the mode-converting coupler 23 (coupler region, mode converter region, optical branching and coupling region; 1×8 FFC) with 1×8 channels with one port of input side (input port) and multiple ports at output side (here, 8 ports, Ports 1 to 8).

One end of the mode-converting coupler 23 is coupled to the input waveguide 21, and the other end is coupled to the output waveguide (linear waveguide) 22 and configured with a triangle-shaped tapered waveguide in which a width is gradually widened from one end (input-side end, input end) to the other end (output-side end, output end) and provides functions to branch or couple optical signals.

In this case, for example, the narrowest width of the tapered waveguide 23 is substantially 1.6 µm and the widest width is substantially 68 µm. The length of the tapered waveguide 23 (mode conversion length) is substantially 280 µm.

Figure 10:
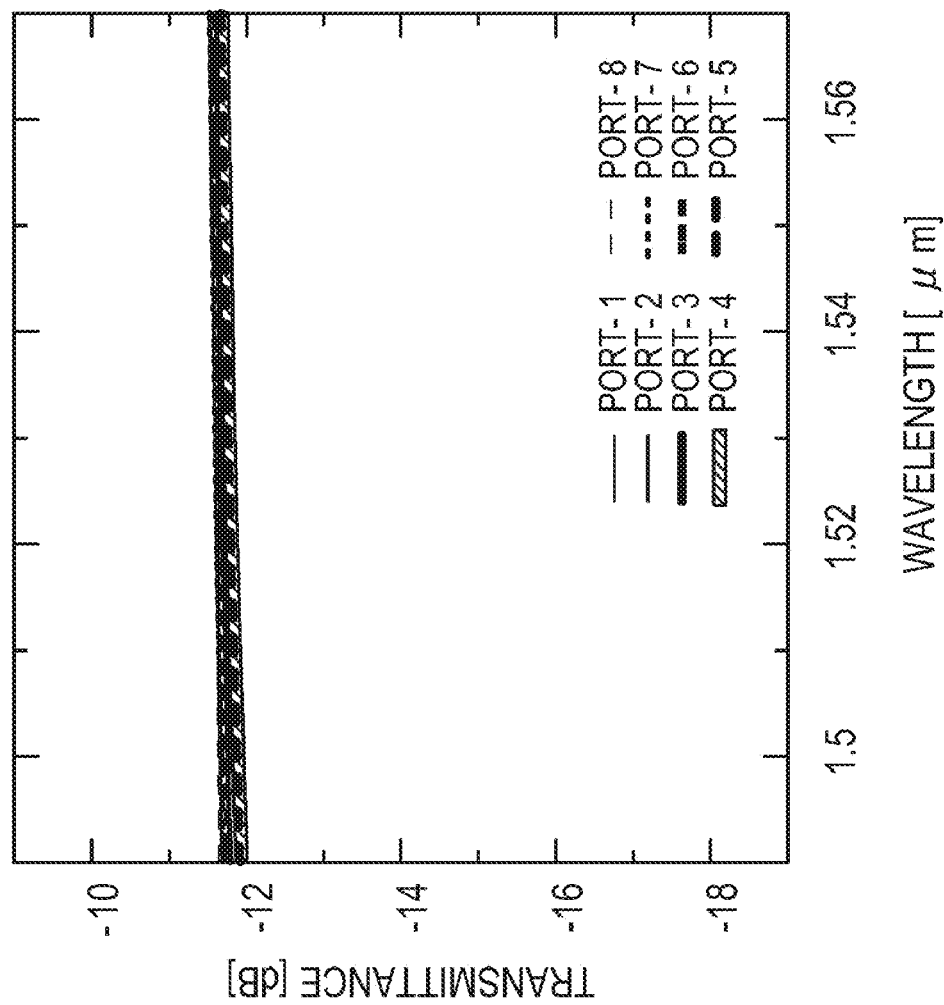
FIG. 10 illustrates transmission characteristics of the optical branching and coupling element that includes a general mode-converting coupler.

FIG. 10 illustrates transmission characteristics (transmittance) of a mode-converting coupler (optical branching and coupling element).

As illustrated in FIG. 10, the mode-converting coupler 23 is designed so that the transmission characteristics (a ratio of light power output from each of the 8 ports of Port 1-Port 8 to light input to one port or light transmission) from the 8 channels of Port 1 to Port 8 are almost the same.

The mode-converting coupler 23 is insensitive to input light wavelength, thus as illustrated in FIG. 10, achieves almost constant and equal branch ratio within a wavelength from the S band to the C band.

The configuration of the optical branching and coupling element that includes a bending waveguide of a related technique will be described by referring to FIGS. 11 and 12.

Figure 11:
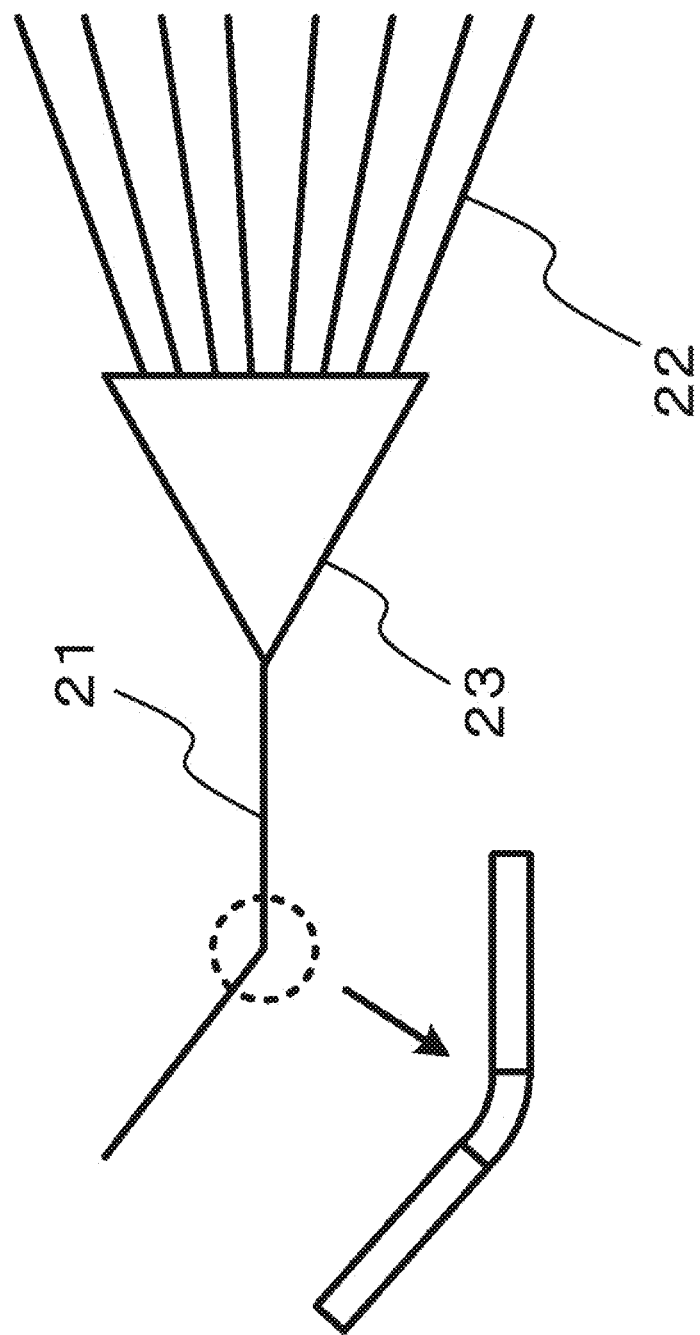
FIG. 11 is a schematic plain view illustrating an optical branching and coupling element that includes a bending waveguide and a mode-converting coupler of a related art.

FIG. 11 illustrates an optical branching and coupling element that includes a mode-converting coupler (1×8 FFC), and a bending waveguide of related art (refer to FIGS. 5 to 7) at an input side (one channel side) as an example of an optical branching and coupling element with a bending waveguide of a related technique. In FIG. 11, the same reference numerals as those in the foregoing optical branching and coupling element with mode-converting coupler (refer to FIG. 9) are assigned for the same items.

As illustrated in FIG. 11, the bending waveguide is the same as the foregoing bending waveguide illustrated in FIG. 6, and the part other than the bending waveguide is the same as the one illustrated in the foregoing FIG. 9.

Figure 12:
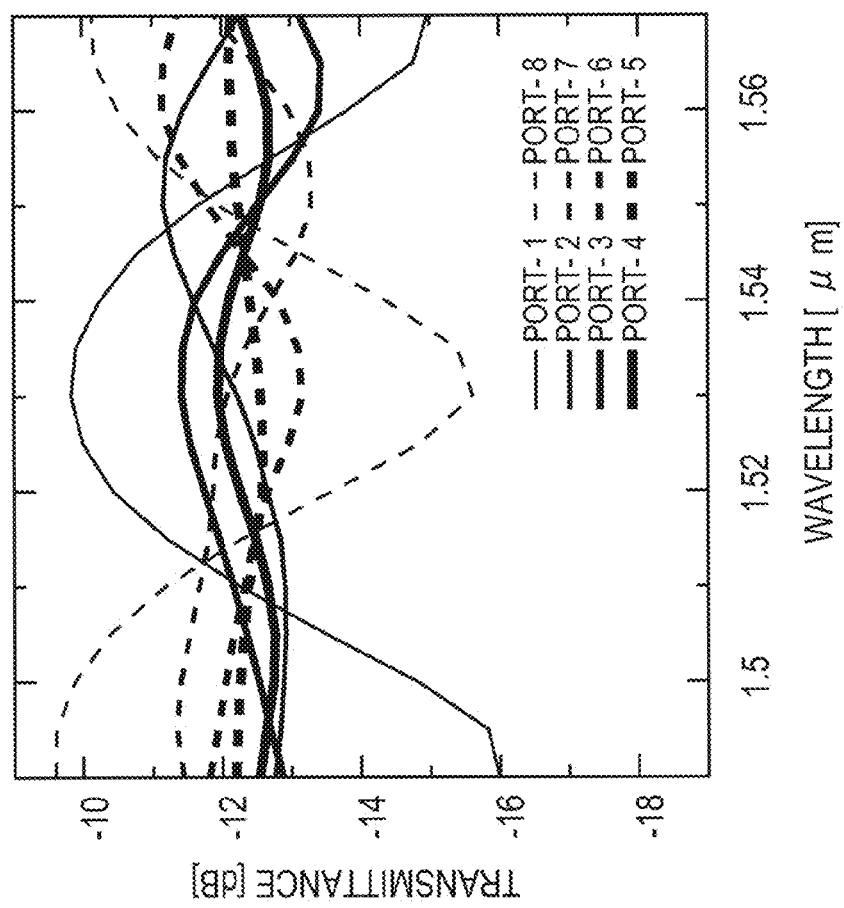
FIG. 12 illustrates transmittance characteristics of an optical branching and coupling element that includes a bending waveguide and a mode-converting coupler of a related art.

FIG. 12 illustrates transmission characteristics (transmittance) of a mode-converting coupler (optical branching and coupling element) illustrated in FIG. 11.

In the optical branching and coupling element that includes the mode-converting coupler 23 and the bending waveguide of a related technique at the input side (refer to FIG. 11), as illustrated in FIG. 12, branching ratios for each of the output ports (Ports 1 to 8) is not constant and moreover transmission characteristics of each of the channels (refer to FIG. 10) fluctuates substantially 6 dB at the maximum (in other words, ripple amplitude in transmission characteristics is about 6 dB), which proves that performance of the optical branching and coupling element is significantly deteriorated.

This is because a higher-order mode is excited in the bending waveguide (bending region) provided at the input side, and the optical wave is incident on a coupler region 23 while meandering. In other words, interference between a fundamental mode and a higher-order mode results in incidence of the input optical wave with noncentrosymmetric mode distribution. Moreover, phases are different between modes depending on light wavelength; thereby a state of mode interference is different. As a result, a wavelength dependence of branch characteristics (transmittance characteristics) of the coupler may occur.

Here, as an example, an optical branching and coupling element that includes a mode-converting coupler is described, however, the disclosure is not limited to this and using other couplers such as a multimode interference (MMI) coupler and a star coupler in a coupler region deteriorates branch characteristics (transmittance characteristics) as in the results illustrated in FIG. 12.

Excitation of a higher mode in a bending region (bending waveguide) may be suppressed by intentionally shifting (offset) the bending waveguide laterally to a linear waveguide (linear region) for an amount of a mode shift.

Such an offset is usually used to suppress a coupling loss due to a mode mismatch between a bending waveguide and a linear waveguide, and may also suppress excitation of a higher-order mode.

Figure 13:
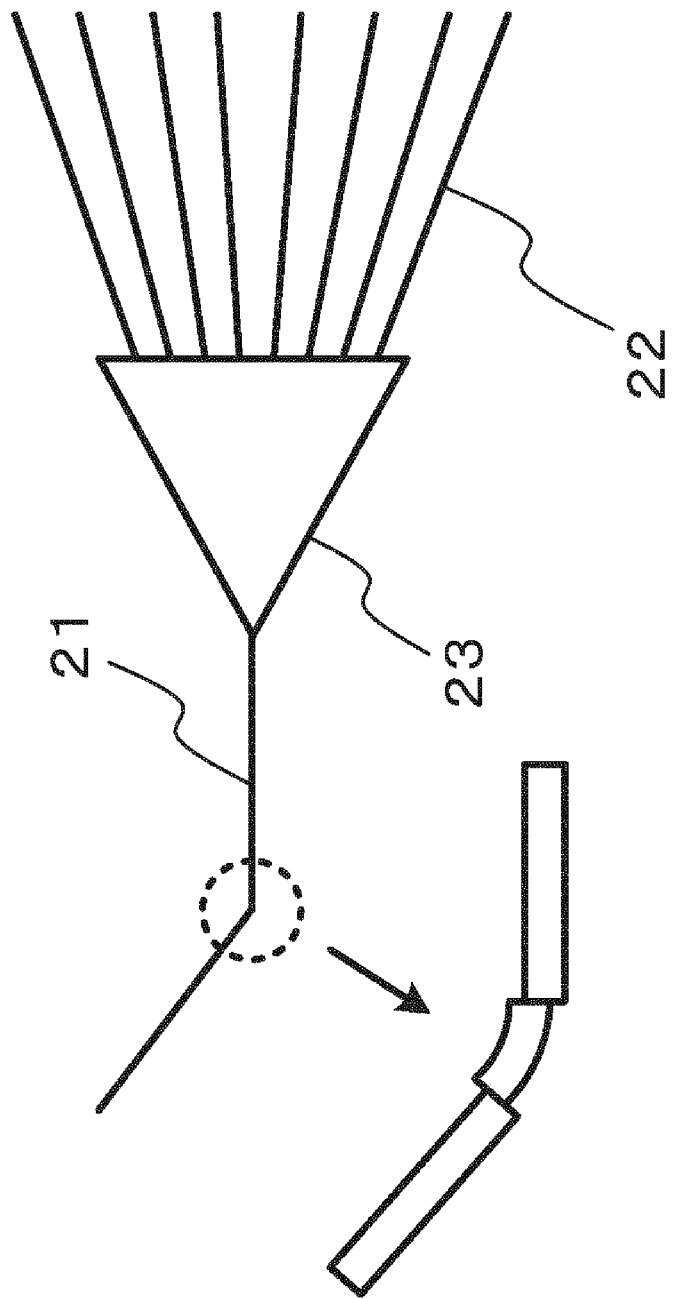
FIG. 13 is a schematic plain view illustrating an optical branching and coupling element that includes a mode-converting coupler in which a bending waveguide of a related art is offset.

FIG. 13 illustrates an optical branching and coupling element in which a waveguide of a related technique provided in the input side (1 channel side) is offset compared with the optical branching and coupling element in FIG. 11. In FIG. 13, the same reference numerals as those in the foregoing optical branching and coupling element (refer to FIG. 11) are assigned for the same items. The offset amount here is substantially 0.2 µm.

Figure 14:
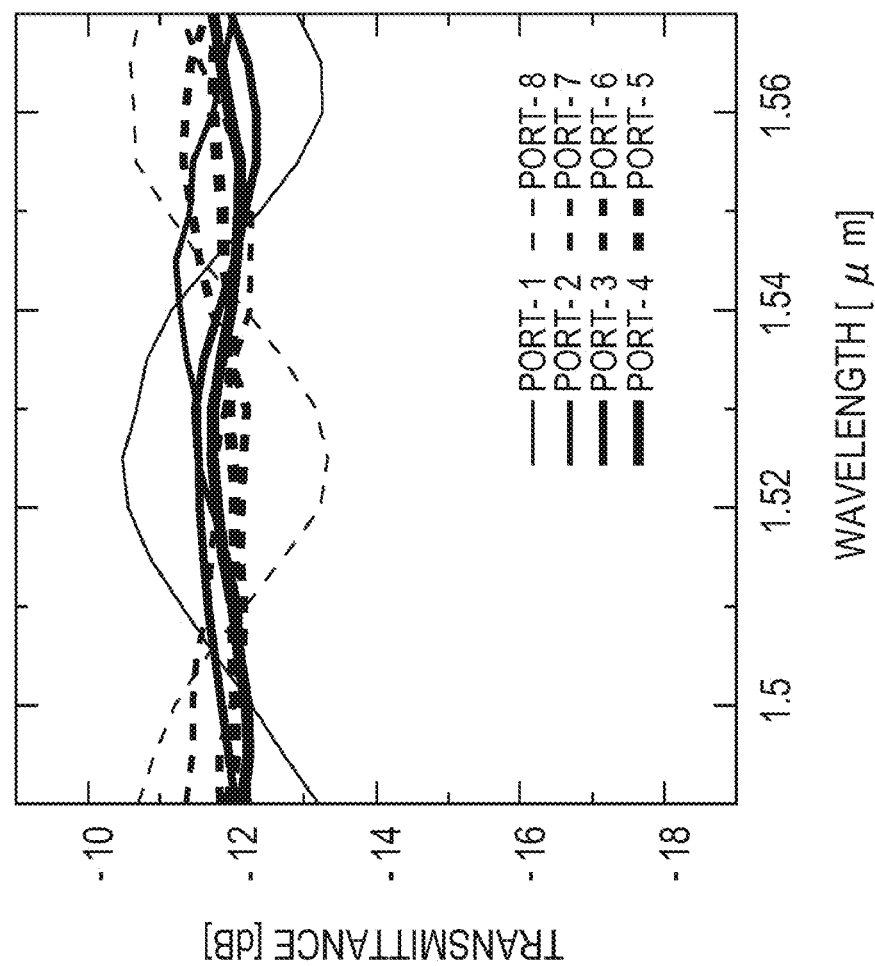
FIG. 14 illustrates transmission characteristics of an optical branching and coupling element that includes a mode-converting coupler in which a bending waveguide of a related art is offset.

FIG. 14 illustrates transmission characteristics (transmittance) of a mode-converting coupler (optical branching and coupling element) illustrated in FIG. 13.

In the optical branching and coupling element in which the bending waveguide of a related technique is offset, as illustrated in FIG. 14, a ripple amplitude of transmittance characteristics is reduced to up to approximately 3 dB.

Figure 15:
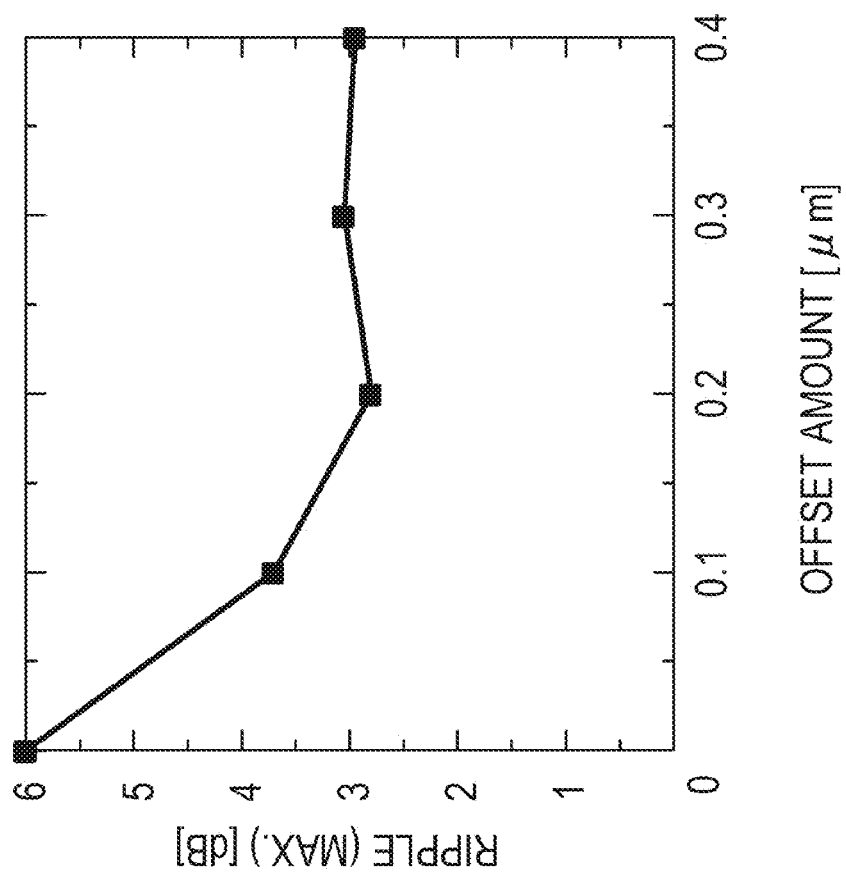
FIG. 15 illustrates a relationship between a ripple amplitude and an offset amount in transmission characteristics of an optical branching and coupling element that includes a mode-converting coupler in which a bending waveguide of a related art is offset.

FIG. 15 illustrates a ripple amplitude (maximum value) in transmittance characteristics of the mode-converting coupler 23 for offset amounts (Δx) between a linear waveguide (linear region) and a bending waveguide (bending region). Optical waveguides and parameters of the coupler are the same as those illustrated in FIG. 9.

As illustrated in FIG. 15, setting the offset amount to the appropriate value reduces the value of the ripple amplitude in transmittance characteristics of the mode-converting coupler 23, however the offset method may not fully suppress excitation of the higher-order mode, thereby ripple of about 2.8 dB may remain, and it is difficult to suppress the ripple 2.8 dB or less.

Thus, according to this embodiment, as illustrated in FIG. 16, a bending waveguide 6 (bending waveguide 2 that includes bending region 2A) of the foregoing first embodiment is applied to the optical branching and coupling element 20 that includes a mode-converting coupler (1×8 FFC) 23.

As illustrated in FIG. 16, a basic configuration of the optical branching and coupling element that includes the mode-converting coupler (1×8 FFC coupler) 23 is the same as the configuration in FIG. 9 and a configuration of a bending waveguide at the input side (bending region included in one input waveguide) is the same as the configuration in FIG. 1. Each of waveguides and optical couplers are integrated over one semiconductor substrate. In this configuration, although no offset is set between a linear waveguide (linear region) and a bending waveguide (bending region), an excitation of a higher-order mode in the bending region may be suppressed because the bending waveguide is configured as illustrated in FIG. 1, thereby no mode interference is generated.

For example, parameters of the optical branching and coupling element 20 that includes the mode-converting coupler 23 are as follows.

Widths of a linear region (linear waveguide) of input waveguide 21 and the output waveguide 22 (linear waveguide) are both substantially 1.6 μm, a width of a bending region 2A of the input waveguide 21 (bending waveguide 2) is substantially 1.0 μm, the narrowest end width and the widest end width of the tapered waveguide 23 that configures a coupler region (FFC region) are substantially 1.6 μm and substantially 68 μm respectively and space between multiple output waveguides 22 is substantially 3.5 μm. The outermost output waveguides 22 (both outermost sides), not shown, includes tapered portions at a part coupled to the tapered waveguide 23 and the widest end width and the narrowest end width of the tapered portions are substantially 4.0 μm and substantially 1.6 μm respectively, and the length is substantially 100 μm (width-tapered waveguide portion with a length of substantially 100 μm).

Figure 17:
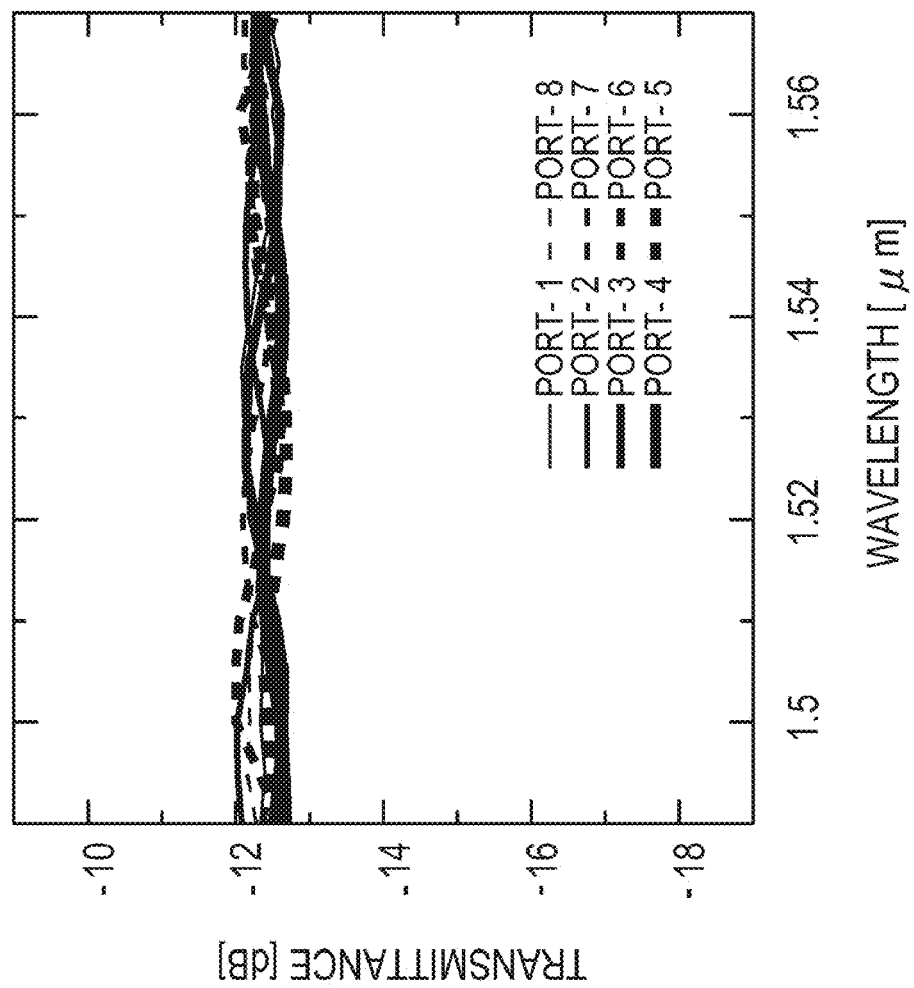
FIG. 17 illustrates transmittance characteristics of optical semiconductor device (an optical branching and coupling element that includes a bending waveguide and a mode-converting coupler according to the first embodiment) according to the third embodiment of the disclosure.

FIG. 17 illustrates the transmittance characteristics of the mode-converting coupler (optical branching and coupling element) in FIG. 16.

In the optical branching and coupling element that includes the mode-converting coupler to which the bending waveguide 6 is applied according to the foregoing embodiment (refer to FIG. 1), as illustrated in FIG. 17, a ripple in transmission characteristics of each of the output channels (Port1-Port8) is substantially 0.5 dB or less as illustrated in FIG. 17, and compared with the results illustrated in FIGS. 12 and 14, the value is significantly improved.

Figure 18:
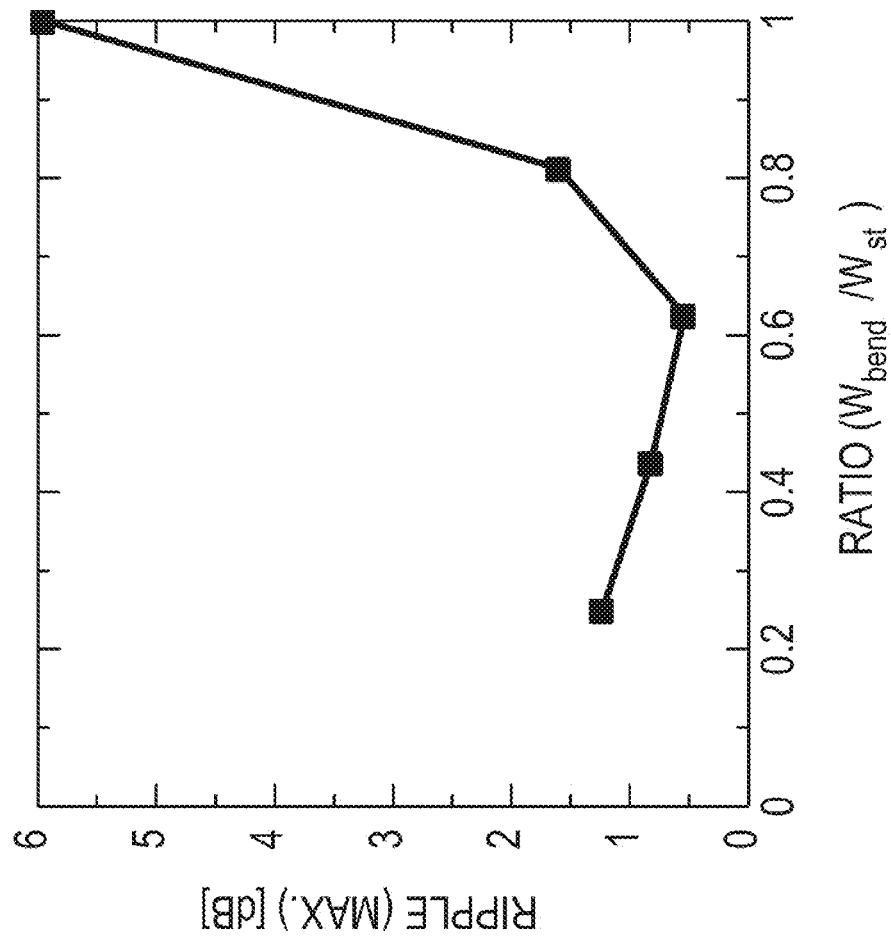
FIG. 18 illustrates a relationship between a ripple amplitude in transmittance characteristics of the optical semiconductor device (optical branching and coupling element that includes the bending waveguide and the mode-converting coupler according to the first embodiment) according to the third embodiment of the disclosure and a width of the bending waveguide (ratio of width of bending waveguide to width of linear waveguide)

FIG. 18 illustrates ripple amplitudes (maximum values) in transmittance characteristics of the mode-converting coupler for a width of the bending waveguide 2 (a ratio of the width of the bending waveguide 2 to widths Wst of linear waveguide 1, 3) of the optical branching and coupling element that includes the mode-converting coupler illustrated in FIG. 16. Parameters of the optical waveguide and the coupler each remain the same as in FIG. 9.

As illustrated in FIG. 18, a value of a ripple amplitude varies depending on a width of the bending waveguide Wbend. For example, when a ratio of a width Wbend to the width of the linear waveguides 1 and 3, in other words, a value of Wbend/Wst is set to approximately 0.625, the ripple amplitude will be reduced to approximately 0.5 dB. When the value of Wbend/Wst is relatively large, a ripple is generated by excitation of a higher-order mode due to a mode shift in the bending waveguide 2 (bending region 2A). When a value of Wbend/Wst is smaller than the appropriate value, the mode may not be confined in the bending waveguide 2 (bending region 2A) due to decrease in a mode confinement factor. As a result, a mode shift is generated, and thereby ripples are generated.

Here, as an example, an optical branching and coupling element that includes a mode-converting coupler is described, however, the disclosure is not limited to this and using other couplers such as a multimode interference (MMI) coupler and a star coupler in a coupler region significantly improves branch characteristics (transmittance characteristics) as in the results illustrated in FIGS. 17 and 18.

According to a structure of the foregoing embodiment, a radiation loss in the bending waveguide 2 could be caused because widths of the waveguide are narrowed locally in order to suppress excitation of a higher-order mode in the bending waveguide 2.

Figure 19:
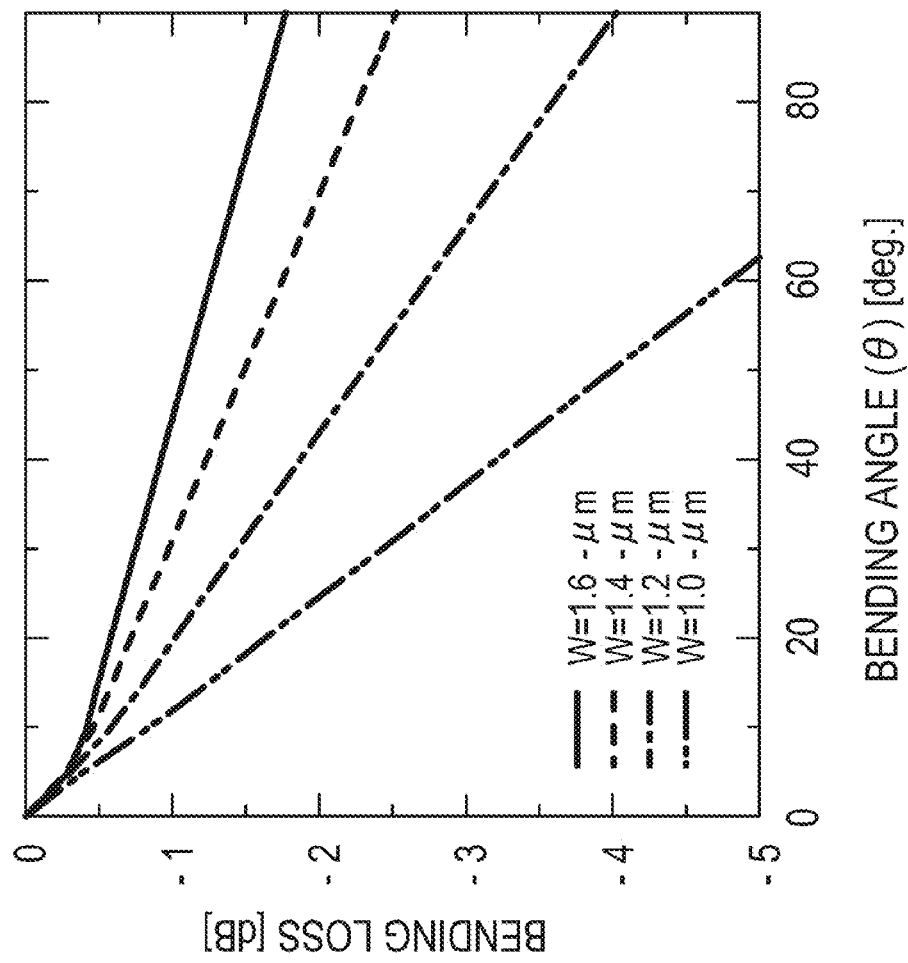
FIG. 19 illustrates a relationship between a bending loss and a bending angle of an optical semiconductor device (optical branching and coupling element that includes a bending waveguide and a mode-converting coupler according to the first embodiment) according to the third embodiment of the disclosure.

FIG. 19 illustrates a radiation loss (bending loss) for a bending angle of a semiconductor buried waveguide 2 (bending region 2A). Here, the radius of curvature in the bending region 2A is substantially 300 μm.

As illustrated in FIG. 19, a radiation loss increases in proportion to a bending angle. Moreover, the narrower the width of the waveguide, the smaller the mode confinement factor, and thereby a radiation loss increases.

Bending losses for bending angles are substantially 0.017 dB/deg (w=substantially 1.6 μm), substantially 0.025 dB/deg (w=substantially 1.4 μm), substantially 0.042 dB/deg (w=substantially 1.2 μm), and substantially 0.078 dB/deg (w=substantially 1.0 μm) respectively.

Such bending loss may be reduced by enlarging a radius of curvature of the bending waveguide 2 (bending region 2A).

For example, when a radius of curvature of the bending region is substantially 500 μm, bending losses are substantially 0.0005 dB/deg (w=substantially 1.6 μm), substantially 0.0006 dB/deg (w=substantially 1.4 μm), substantially 0.0026 dB/deg (w=substantially 1.2 μm), and substantially 0.012 dB/deg (w=substantially 1.0 μm).

However, enlarging a radius of curvature as above increases the size of an element; therefore there is a trade-off relationship between a bending loss and an element size.

Figure 20:
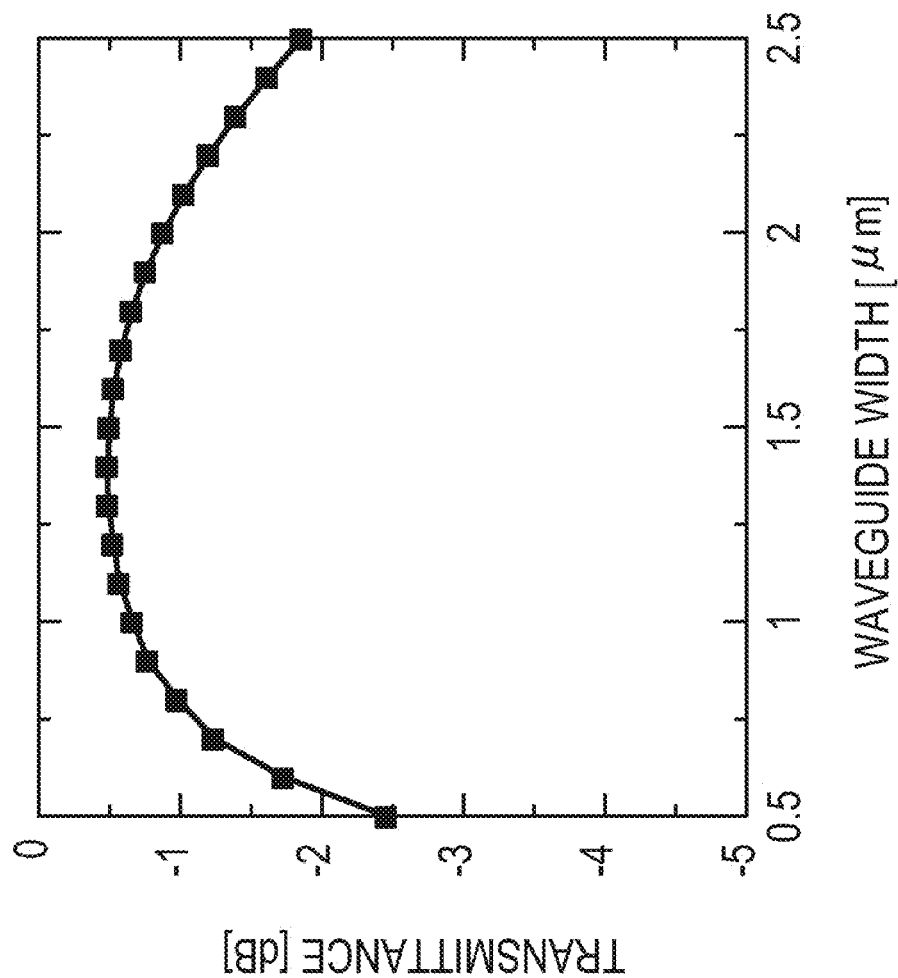
FIG. 20 illustrates a relationship between a width of a bending waveguide and transmission characteristics of an optical semiconductor device (optical branching and coupling element that includes a bending waveguide and a mode-converting coupler according to the first embodiment) according to the third embodiment of the disclosure.

FIG. 20 illustrates a radiation loss (transmittance characteristics, transmittance) for a width of a bending waveguide provided with an optical branching and coupling element that includes a mode-converting coupler illustrated in FIG. 16.

When a bending angle of a bending waveguide of the optical branching and coupling element that includes the mode-converting coupler as illustrated in FIG. 16 is approximately 7 degrees, an excessive loss for a peak loss is suppressed to substantially 0.3 dB or less even when a width of the waveguide is around 1.0 μm.

Therefore, using the structure according to the foregoing embodiment may achieve a uniform branching ratio as illustrated in FIG. 17 without increasing an excessive loss.

By configuring an optical branching and coupling element that includes a mode-converting coupler (1×8 FFC) as described the above, excitation of a higher-order mode in the bending waveguide of the input side may be suppressed, and desirable branching and coupling characteristics may be achieved, for example, a wavelength range of up to tens of nanometers.

Here, as an example, an optical branching and coupling element that includes a mode-converting coupler is described, however, the disclosure is not limited to this and may be configured using other couplers such as a multimode interference (MMI) coupler and a star coupler in a coupler region and in this case the same desirable characteristics as described above may be achieved as well.

Other configuration and manufacturing method are the same as the first embodiment, thus the explanation is omitted here.

Hence, the optical semiconductor device and the manufacturing method according to this embodiment, as in the foregoing first embodiment, is advantageous in that excitation of a higher-order mode in the bending waveguide 6 (a bending waveguide 2 that includes a bending region 2A) may be prevented.

In particular, configuring an optical branching and coupling element by applying a bending waveguide 6 according to the foregoing first embodiment may prevent a higher-order mode from being excited and therefore, achieve optical branching and coupling characteristics with small wavelength ripples over a wide bandwidth, in other words, excellent interchannel balance characteristics. Thus, a compact optical branching and coupling element may be achieved.

According to the foregoing embodiment, as an example, an optical branching and coupling element that provides a mode-converting optical coupler 23 and optical waveguides 21 and 22 over a semiconductor substrate is described. However, the disclosure is not limited to this, and for example, other optical functional elements such as a semiconductor optical amplifier, a semiconductor laser (laser light source), an optical modulator, a phase modulator, and an optical filter and waveguides may be integrated over the semiconductor substrate where the optical branching and coupling element is formed to configure an optical integrated element (semiconductor optical integrated device) with advanced functions.

For example, an optical integrated element (semiconductor optical integrated device) may be configured with a first optical element, an optical waveguide coupled to the first optical element, a second optical element coupled to the optical waveguide and a bending waveguide 6 applied to the waveguide that couples the first optical element and the second optical element.

Hereunder, an example of a configuration of an optical integrated device will be described that includes a plurality of first optical elements and optical waveguides and the plurality of the first optical elements are coupled to each of the plurality of the optical waveguides, other optical waveguide coupled to a second optical element, and further includes a third optical element coupled to another optical waveguide and each of the optical elements and optical waveguides are integrated over the same semiconductor substrate.

Here, as an example, a case is described in which a bending waveguide 6 according to the foregoing first embodiment is applied to an optical waveguide that couples the first optical element and the second optical element. However, the disclosure is not limited to this. For example, a bending waveguide 6 according to the foregoing first embodiment may be applied to the other waveguide that couples the second optical element and the third optical element.

Figure 21:
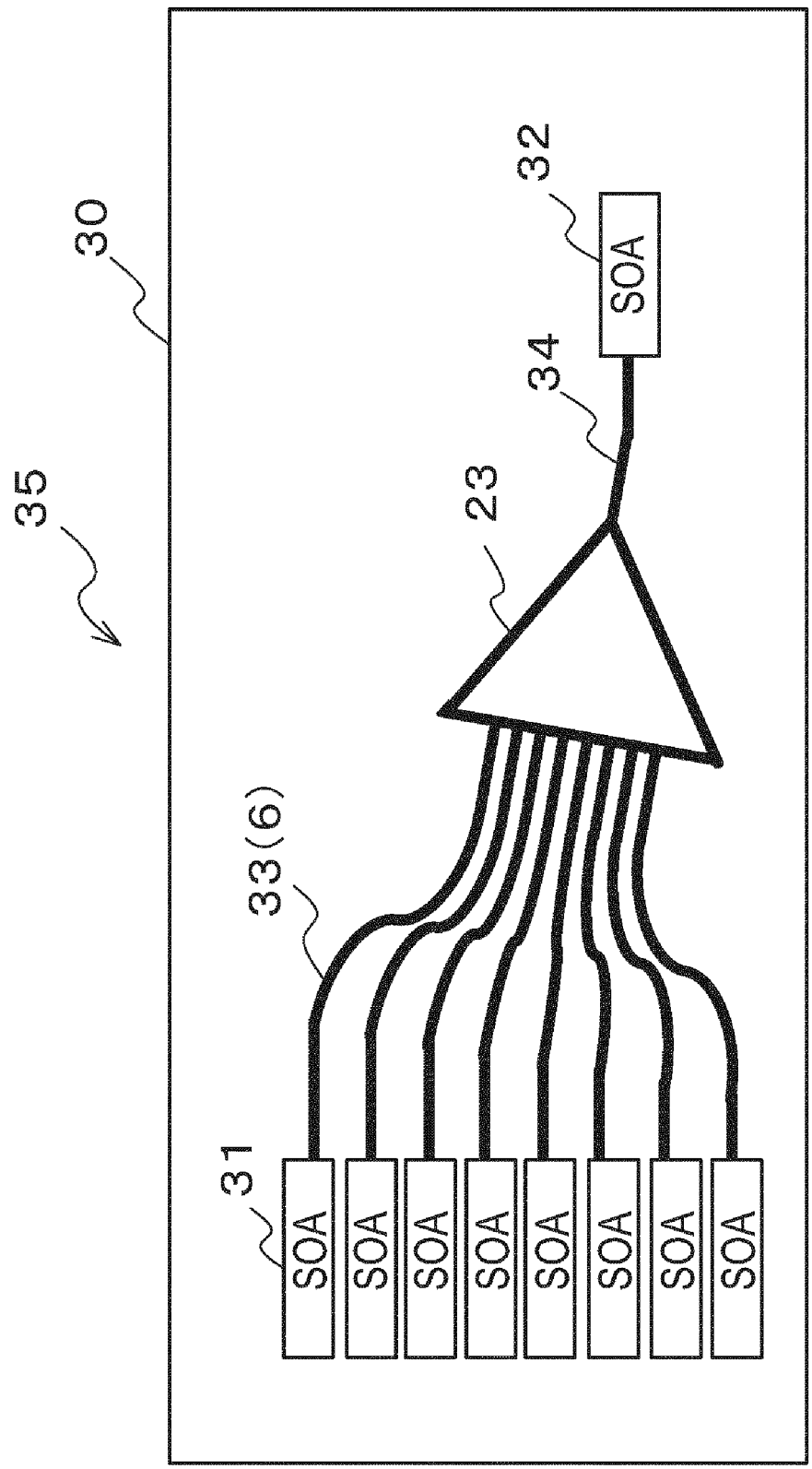
FIG. 21 is a schematic plain view illustrating an exemplary configuration of an optical semiconductor device (optical integrated element) using the optical semiconductor device (optical branching and coupling element that includes a bending waveguide and a mode-converting coupler according to the first embodiment) according to the third embodiment of the disclosure.

For example, as illustrated in FIG. 21, an optical gate switch 35 may be configured as an optical integrated element by monolithically integrating a mode-converting optical coupler 23 according to the foregoing embodiment, and semiconductor optical amplifiers (SOAs) 31 and 32 over a single semiconductor substrate (the same semiconductor substrate) 30. Here, a plurality of SOAs (SOA gate array; a first optical element) 31 are coupled to the input side of the mode-converting optical coupler (second optical element) 23 through a plurality of bending waveguides (input waveguide; including a bending waveguide 6 according to the first embodiment (refer to FIG. 1)) 33, and one SOA (third optical element) 32 is coupled to the output side of the mode-converting optical coupler 23 through one optical waveguide (output waveguide, other optical waveguide) 34.

The optical gate switch 35 as configured above is capable of picking up optical signals from a desired channel by a current control over the plurality of SOAs 31 located on the input side. At that time, the optical gate switch 35 is capable of high-quality optical signal processing because the mode-converting optical coupler 23 according to the foregoing embodiment maintains constant light intensity of a wavelength-multiplexed optical signal by virtue of excellent interchannel balance characteristics.

Figure 22:
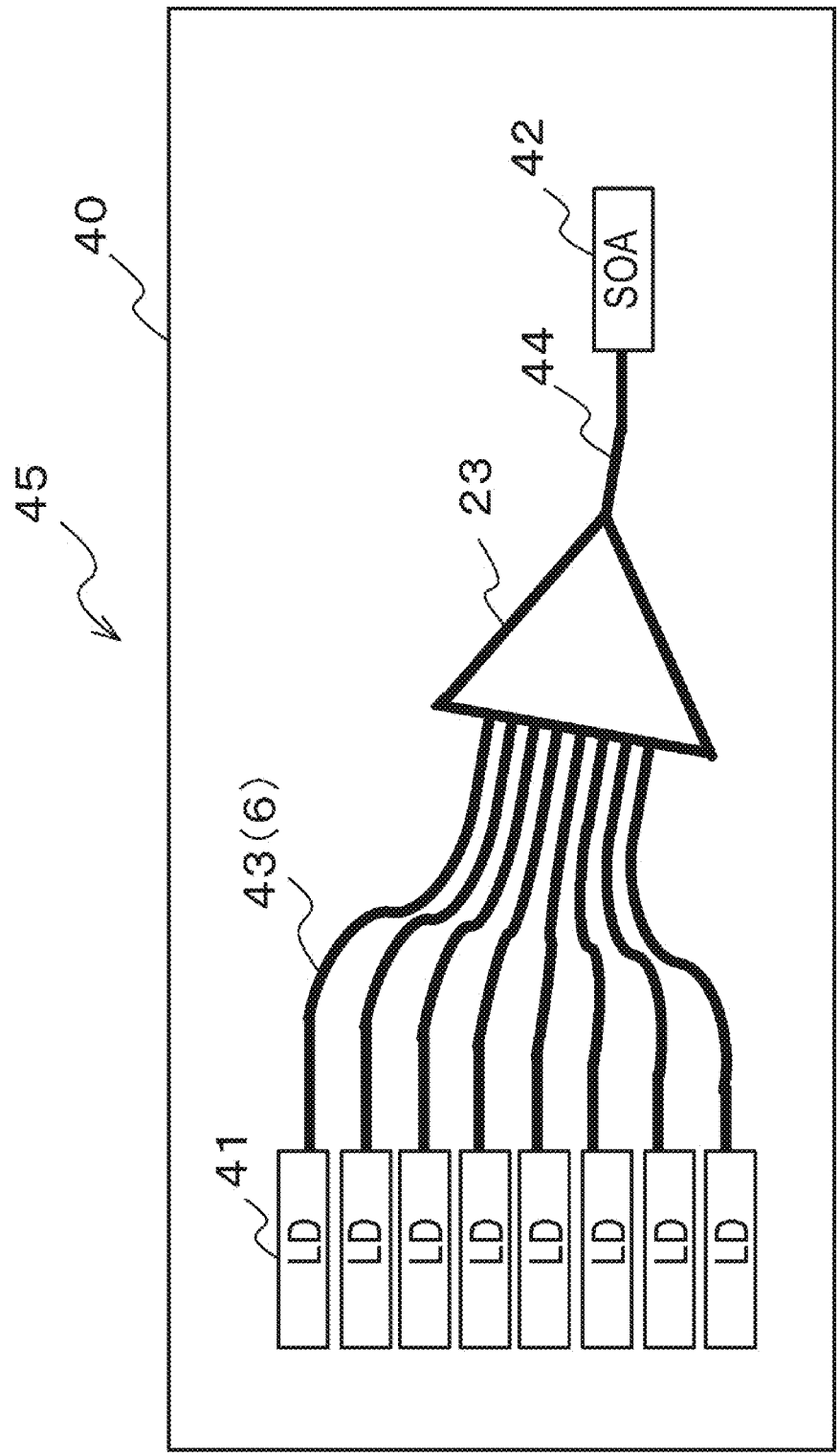
FIG. 22 is a schematic plain view illustrating another exemplary configuration of the optical semiconductor device (optical integrated element) using the optical semiconductor device (optical branching and coupling element that includes a bending waveguide and a mode-converting coupler according to the first embodiment) according to the third embodiment of the disclosure.

As illustrated in FIG. 22, a tunable laser (tunable light source) 45 may be configured as an optical integrated element by monolithically integrating a mode-converting optical coupler 23 according to the foregoing embodiment, semiconductor lasers (laser diodes (LDs)) 41, and a semiconductor optical amplifier (SOA) 42 over a single semiconductor substrate (the same semiconductor substrate) 40. Here, the plurality of semiconductor lasers (first optical elements) 41 are coupled to the input side of the mode-converting optical coupler (a second optical element) 23 through the plurality of bending waveguides (input waveguides, including a bending waveguide 6 according to the foregoing first embodiment (refer to FIG. 1)) 43, while the SOA 42 (third optical element) is coupled to the output side of the mode-converting optical coupler 23 through the single optical waveguide (output waveguide, other optical waveguide) 44.

As the semiconductor lasers 41, a temperature controllable distributed feedback (DFB) laser, a current injection controlled tunable distributed amplification (TDA)-DFB laser, or the like may be employed. In this case, each of the semiconductor lasers 41 is capable of wavelength tuning over a wavelength range of several nanometers. Accordingly, the tunable laser using the mode-converting optical coupler 23 according to the foregoing embodiment is capable of a broadband wavelength tuning operation throughout the C band and L band. The tunable laser may maintain constant laser output powers of all the channels by virtue of the excellent interchannel balance characteristics and the low wavelength dependence of the mode-converting optical coupler according to the foregoing embodiment.

Figure 23:
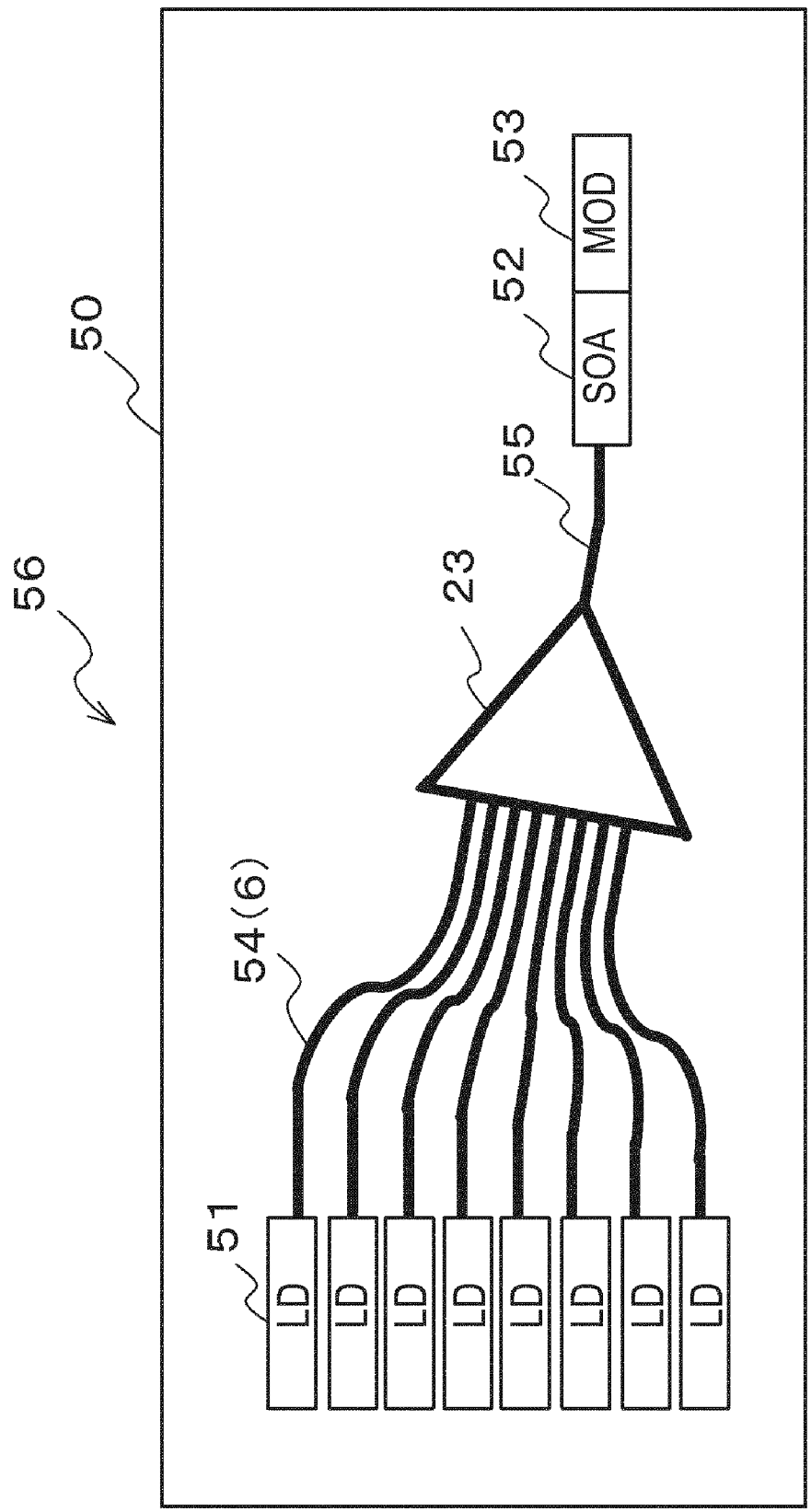
FIG. 23 is a schematic plain view illustrating yet another exemplary configuration of the optical semiconductor device (optical integrated element) using the optical semiconductor device (optical branching and coupling element that includes a bending waveguide and a mode-converting coupler according to the first embodiment) according to the third embodiment.

For example, as illustrated in FIG. 23, an external modulator integrated tunable laser (external modulator integrated tunable light source) 56 may be configured as an optical integrated device by monolithically integrating a mode-converting optical coupler 23, a semiconductor laser (LD, laser diode) 51, a semiconductor optical amplifier (SOA) 52 and an optical modulator (MOD) 53 over a single semiconductor substrate (the same semiconductor substrate) 50. Here, the plurality of semiconductor lasers 51 are coupled to the input side of the mode-converting optical coupler (second optical element) 23 through the plurality of bending waveguides (input waveguides, including a bending waveguide 6 according to the foregoing first embodiment (refer to FIG. 1)) 54, while the SOA (third optical element) 52 and the MOD (third optical element) 53 are coupled to the output side of the mode-converting optical coupler 23 through the single optical waveguide (output waveguide, other waveguide) 55.

Figure 24:
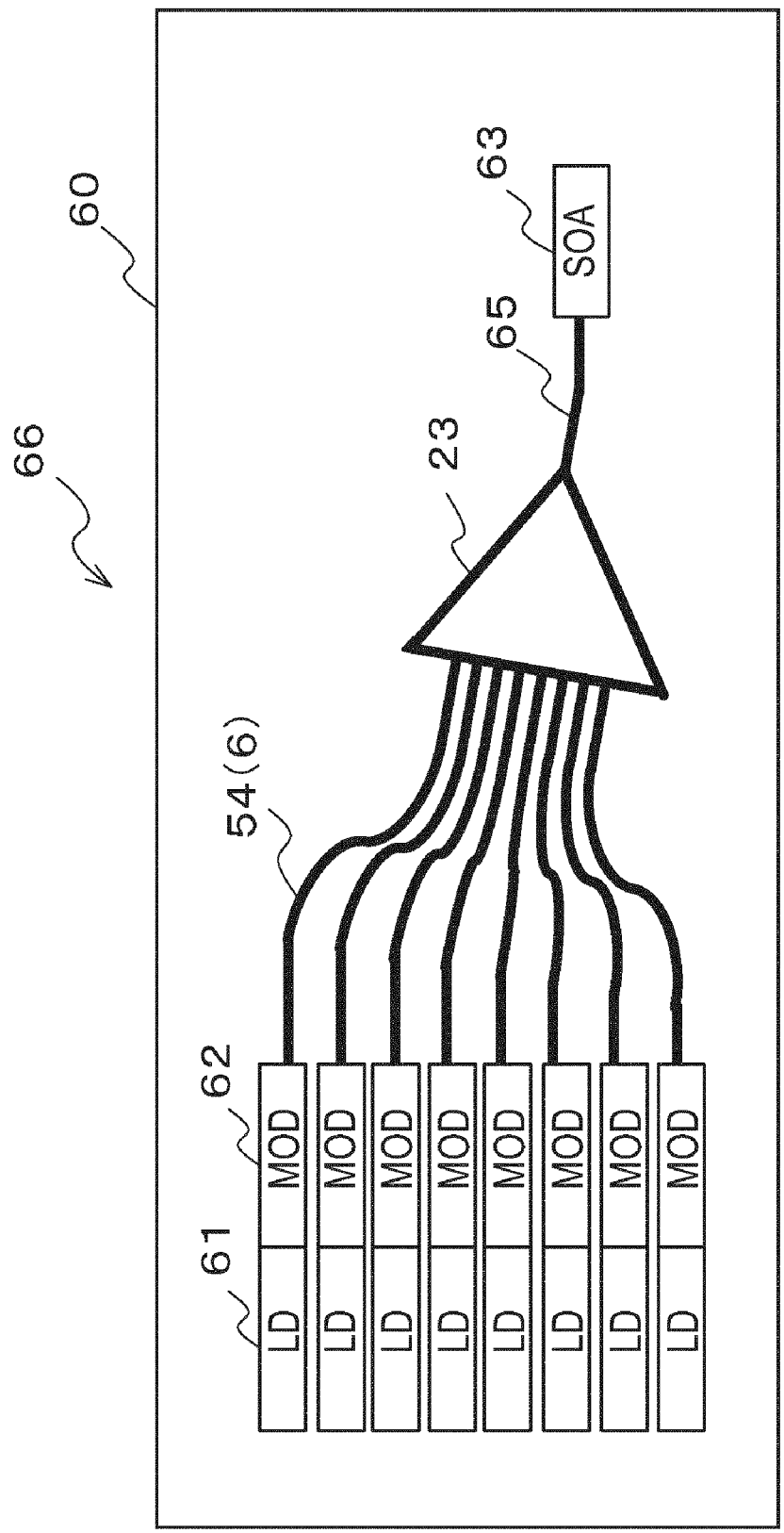
FIG. 24 is a schematic plain view illustrating yet another exemplary configuration of the optical semiconductor device (optical integrated element) using the optical semiconductor device (optical branching and coupling element that includes a bending waveguide and a mode-converting coupler according to the first embodiment) according to the third embodiment.

As illustrated in FIG. 24, for example, an optical integrated device 66 may be configured by monolithically integrating the mode-converting optical coupler 23 according to the foregoing embodiment, a semiconductor laser (LD, laser diode) 61, an optical modulator (MOD) 62, and a semiconductor optical amplifier (SOA) 63 over a single semiconductor substrate (the same semiconductor substrate) 60. Here, a plurality of semiconductor lasers (first optical element) and a plurality of MODs (first optical element) are coupled to the input side of the mode-converting optical coupler (a second optical element) 23 through the plurality of bending waveguides (input waveguides, including a bending waveguide 6 according to the forgoing first embodiment (refer to FIG. 1)) 64, while a SOA (third optical element) 63 is coupled to the output side of the mode-converting optical coupler 23 through the single optical waveguide (output waveguide, other waveguide) 65.

Figure 25:
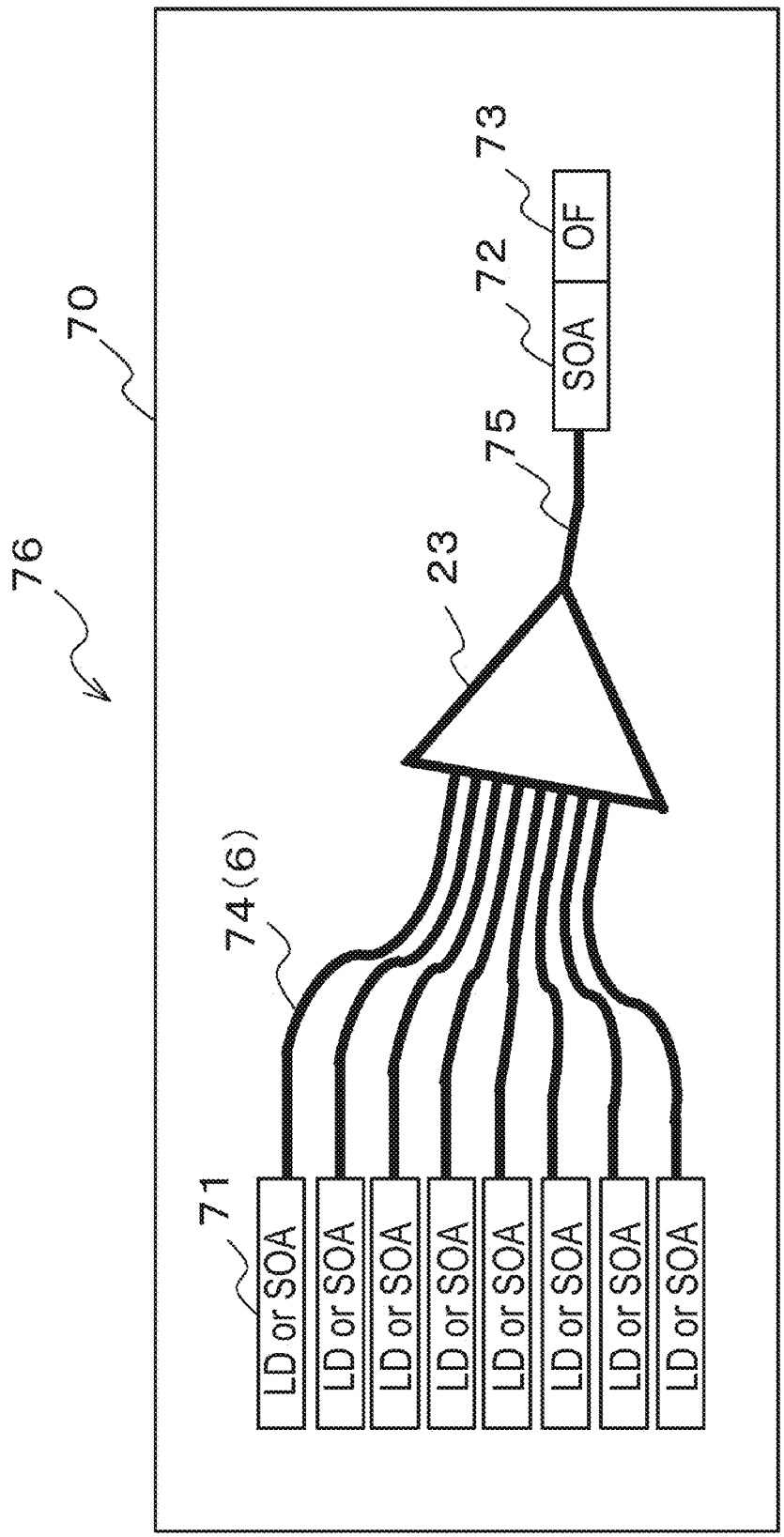
FIG. 25 is a schematic plain view illustrating yet another exemplary configuration of the optical semiconductor device (optical integrated element) using the optical semiconductor device (optical branching and coupling element that includes a bending waveguide and a mode-converting coupler according to the first embodiment) according to the third embodiment.

As illustrated in FIG. 25, for example, an optical integrated device 76 may be configured by monolithically integrating the mode-converting optical coupler 23 according to the foregoing embodiment, a semiconductor laser (laser diode (LD), semiconductor optical amplifier (SOA)) 71, a semiconductor optical amplifier (SOA) 72 and an optical filter (OF) 73 over a single semiconductor substrate (the same semiconductor substrate) 70. Here, a plurality of semiconductor lasers (SOA, a first optical element) 71 is coupled to the input side of the mode-converting optical coupler (second optical element) 23 through a plurality of bending waveguides (input waveguide, including a bending waveguide 6 according to the foregoing first embodiment (refer to FIG. 1)) while SOA (third optical element) and OF (third optical element) 73 are coupled to the output side of the mode-converting optical coupler 23 through one optical waveguide (output waveguide, other optical waveguide) 75. This configuration is capable of substantially eliminating a spontaneous emission light component from the SOA. Also, this configuration is capable of picking up only a desired wavelength component when a wavelength-multiplexed signal train is input.

Figure 26A:
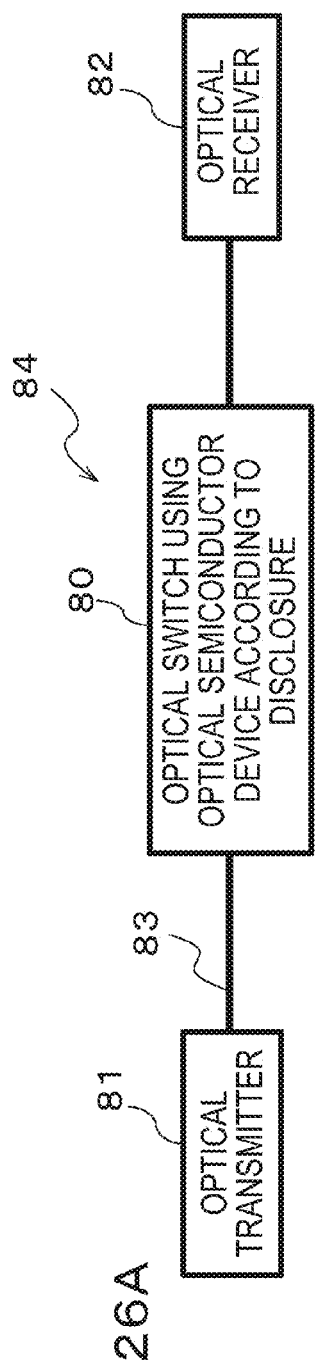
FIGS. 26A and 26B are schematic plain views illustrating exemplary configuration of the optical transmission device using the optical semiconductor device according to the third embodiment.
Figure 26B:
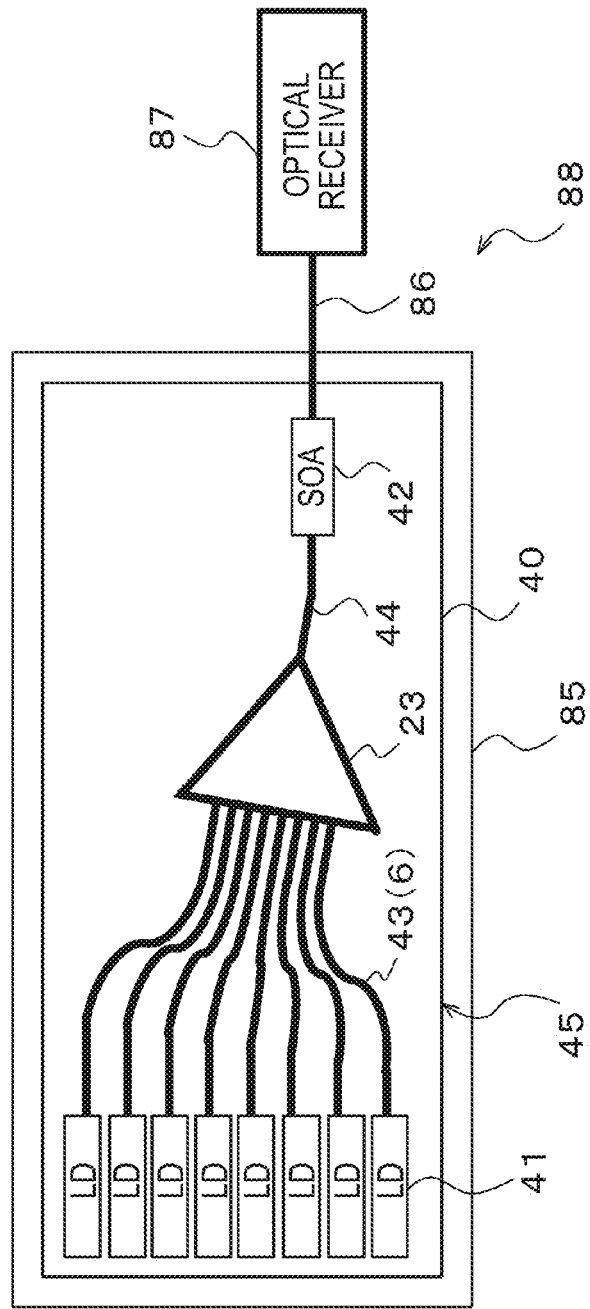

Such optical integrated devices (optical waveguide device that includes a bending waveguide 6 according to the foregoing first embodiment (refer to FIG. 1)) make highly functional optical signal processing possible. Thus, for example, as illustrated in FIG. 26A, making a high-performance optical transmitter 84 is possible by configuring an optical switch (for example, N×N optical switch) 80 with such highly functional optical integrated device (optical semiconductor device that includes the bending waveguide 6 according to the foregoing first embodiment (refer to FIG. 1)), and by providing the optical switch 80 on an optical transmission line 83 between an optical transmitter 81 and optical receiver 82 to configure the optical transmitter 84. Moreover, for example, as illustrated in FIG. 26B, making a high-performance optical transmission device 88 is possible by configuring an optical transmitter 85 that provides the foregoing tunable laser (tunable light source) 45 (refer to FIG. 22), and coupling the optical transmitter 85 to the optical receiver 87 through the optical transmission line 86.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. An optical semiconductor device, comprising:
a first optical waveguide with a first width;
a second optical waveguide with a second width narrower than the first width and a bending region;
a third optical waveguide with a third width wider than the second width and coupled to the second optical waveguide; and
a burying material that directly surrounds the first optical waveguide and the second waveguide and that works as a part of clad, the first optical waveguide, the second waveguide and third waveguide being made of GaAsInP and the burying material being made of InP.
2. The optical semiconductor device according to claim 1, further comprising:
a first tapered optical waveguide with one end having the first width and other end having the second width and disposed between the first optical waveguide and the second optical waveguide.

3. The optical semiconductor device according to claim 2, wherein
the second optical waveguide is offset with respect to the first tapered optical waveguide.
4. The optical semiconductor device according to claim 1, further comprising:
a second tapered optical waveguide with one end having the second width and other end having the third width and disposed between the second optical waveguide and the third optical waveguide.
5. The optical semiconductor device according to claim 4, wherein
the second optical waveguide is offset with respect to the second tapered optical waveguide.
6. The optical semiconductor device according to claim 1, wherein
the second optical waveguide is offset with respect to the first optical waveguide and the third optical waveguide.
7. The optical semiconductor device according to claim 1, wherein
the first optical waveguide and the third optical waveguide have a waveguide width that satisfies a single-mode condition.
8. The optical semiconductor device according to claim 1, further comprising:
a burying structure that buries the first optical waveguide, the second optical waveguide and the third optical waveguide.
9. An optical semiconductor device comprising:
a first optical element;
an optical waveguide coupled to the first optical element;
a second optical element coupled to the optical waveguide, wherein the optical waveguide comprising:
a first optical waveguide with a first width and coupled to the first optical element;
a second optical waveguide with a second width narrower than the first width that includes a bending part and coupled to the first optical waveguide;
a third optical waveguide with a third width wider than the second width and coupled to the second optical waveguide; and
a burying material that directly surrounds the first optical waveguide and the second waveguide and that works as a part of clad, the first optical waveguide, the second waveguide and third waveguide being made of GaAsInP and the burying material being made of InP.
10. The optical semiconductor device according to claim 9, wherein a plurality of the optical waveguides and a plurality of the first optical elements are provided; and
wherein each of the plurality of the first optical elements are coupled to a single first optical wave guide of the plurality of the first optical waveguides.
11. The optical semiconductor device according to claim 10, wherein
the first optical element is an optical amplifier; and
the second optical element is an optical coupler that outputs a plurality of multiplexed lights maintaining constant intensity.
12. The optical semiconductor device according to claim 11, further comprising:
a second optical waveguide coupled to the second optical element; and
a third optical element coupled to the second optical waveguide, wherein the third optical element is an optical amplifier and an optical filter.
13. The optical semiconductor device according to claim 11, further comprising:
a second optical waveguide coupled to the second optical element;

a third optical element coupled to the second optical waveguide; wherein
the third optical element is an optical amplifier.

14. The optical semiconductor device according to claim 13, wherein
the second optical waveguide comprising:
a fourth optical waveguide with a fourth width and coupled to the second optical element;
a fifth optical waveguide with a fifth width narrower than the fourth width and that includes a bending part; and
a sixth optical waveguide with a sixth width wider than the fifth width and coupled to the fifth optical waveguide.

15. The optical semiconductor device according to claim 10, wherein
the first optical element is a laser; and
the second optical element is an optical coupler that outputs a plurality of multiplexed lights, each light maintaining a constant light power.

16. The optical semiconductor device according to claim 15, further comprising:
a second optical waveguide coupled to the second optical element;
a third optical element coupled to the second optical waveguide, wherein
the third optical element is an optical amplifier and an optical modulator.

17. The optical semiconductor device according to claim 10, wherein
the first optical element is a laser and an optical modulator; and
the second optical element is an optical coupler that outputs a plurality of multiplexed lights, each light maintaining a constant light power.

18. The optical semiconductor device according to claim 9, wherein
the optical element and the optical waveguide are integrated on the same semiconductor substrate.

19. An optical transmission device comprising:
a first optical element;
an optical waveguide coupled to the first optical element;
a second optical element coupled to the optical waveguide, wherein the optical waveguide comprising:
a first optical waveguide with a first width and coupled to the first optical element;
a second optical waveguide with a second width narrower than the first width and a bending part and coupled to the first optical waveguide;
a third optical waveguide with a third width wider than the second width and coupled to the second optical waveguide; and
a burying material that directly surrounds the first optical waveguide and the second waveguide and that works as a part of clad, the first optical waveguide, the second waveguide and third waveguide being made of GaAsInP and the burying material being made of InP.

20. An optical semiconductor manufacturing method comprising:
forming a core layer and a clad layer over a semiconductor substrate; and
processing the core layer
to form a waveguide stripe structure in which a first optical waveguide with a first width, a second optical waveguide with a second width narrower than the first width and a bending part, and a third optical waveguide with a third width wider than the second width are formed, and
to form a part of clad using a burying material by directly surrounding the first optical waveguide and the second waveguide, the first optical waveguide, the second waveguide and third waveguide being made of GaAsInP and the burying material being made of InP.

21. An optical semiconductor device comprising:
an optical waveguide coupled to a first optical element;
an optical splitter coupled to the optical waveguide, wherein the optical waveguide comprising:
a first optical waveguide with a first width and coupled to the first optical element;
a second optical waveguide with a second width narrower than the first width that includes a bending part and coupled to the first optical waveguide;
a third optical waveguide with a third width wider than the second width and coupled to the second optical waveguide;
a burying material that directly surrounds the first optical waveguide and the second waveguide and that works as a part of clad, the first optical waveguide, the second waveguide and third waveguide being made of GaAsInP and the burying material being made of InP, wherein
the optical splitter outputs a plurality of branched lights, and each of which is substantially equal optical power and inputs a light input from the optical waveguide.

22. An optical semiconductor device, comprising:
a first optical waveguide with a first width;
a second optical waveguide with a second width narrower than the first width and a bending region;
a third optical waveguide with a third width wider than the second width and coupled to the second optical waveguide; and
a burying material that directly surrounds the first optical waveguide and the second waveguide and that works as a part of clad, the burying material being a small refractive index difference with respect to the first optical waveguide, the second waveguide and third waveguide so that an excitation of a high-order mode is suppressed.

* * * * *